(12) United States Patent
Ke

(10) Patent No.: US 12,490,319 B2
(45) Date of Patent: Dec. 2, 2025

(54) INFORMATION TRANSMISSION METHOD AND COMMUNICATIONS DEVICE

(71) Applicant: VIVO MOBILE COMMUNICATION CO., LTD., Guangdong (CN)

(72) Inventor: Xiaowan Ke, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 928 days.

(21) Appl. No.: 17/695,969

(22) Filed: Mar. 16, 2022

(65) Prior Publication Data

US 2022/0210850 A1 Jun. 30, 2022

Related U.S. Application Data

(63) Continuation of application No. PCT/CN2020/115895, filed on Sep. 17, 2020.

(30) Foreign Application Priority Data

Sep. 19, 2019 (CN) .......................... 201910888948.8
Aug. 11, 2020 (CN) .......................... 202010803276.9

(51) Int. Cl.
*H04W 76/12* (2018.01)
*H04W 56/00* (2009.01)

(52) U.S. Cl.
CPC ......... *H04W 76/12* (2018.02); *H04W 56/001* (2013.01)

(58) Field of Classification Search
CPC ..... H04W 76/12; H04W 76/10; H04W 12/02; H04W 56/001; H04W 56/00; H04W 56/0015; H04L 63/00

See application file for complete search history.

(56) References Cited

U.S. PATENT DOCUMENTS

| 2019/0238441 | A1 | 8/2019 | Gotz et al. |
| 2019/0394745 | A1 | 12/2019 | Yu |
| 2021/0219357 | A1* | 7/2021 | Talebi Fard ............ H04L 67/14 |
| 2022/0014296 | A1 | 1/2022 | Wang |

(Continued)

FOREIGN PATENT DOCUMENTS

| CN | 108574969 A | 9/2018 |
| CN | 11009903 A | 8/2019 |
| CN | 110213007 A | 9/2019 |

(Continued)

OTHER PUBLICATIONS

Apple, "KI #2, New Sol: UPF triggered UE-UE TSC communication", SA WG2 Meeting #139E, S2-2004640, Elbonia, Jun. 1-12, 2020.

(Continued)

*Primary Examiner* — Brian T Le
(74) *Attorney, Agent, or Firm* — Price Heneveld LLP

(57) ABSTRACT

Embodiments of the present invention provide an information transmission method and a communications device. The method includes: obtaining first information; and sending the first information; where the first information includes bridge-related information of a first port pair; the first port pair includes a first port and a second port; the first port is a port of a first TT, and the second port is a port of a second TT; and the first TT is a first DS-TT and the second TT is a second DS-TT; or the first TT is a first NW-TT and the second TT is a second NW-TT.

20 Claims, 13 Drawing Sheets

(56) References Cited

U.S. PATENT DOCUMENTS

2022/0303070 A1* 9/2022 Kahn .................. H04W 12/084
2022/0321485 A1* 10/2022 Rost .................. H04W 28/0263

FOREIGN PATENT DOCUMENTS

KR          20190005553 A      1/2019
WO           2019166081 A1     9/2019

OTHER PUBLICATIONS

Vivo, "Key issue# X: TSC communication between the port pair at the same TT", 3GPP SA WG2 Meeting #136, 62-1912721, Nov. 18-22, 2019, Reno, USA.
Qualcomm Inc., "Completing Ethernet port management", 3GPP TSG-SA WG2 Meeting #133, S2-1908563, Sapporo, Japan, Jun. 23-28, 2019.
Qualcomm Inc., "Completing Ethernet port management", SA WG2 Meeting #134, S2-1906940, Jun. 24-28, 2019, Sapporo, Japan.
Vivo, "Tsn bridge Managed Objects (MO) collection", 3GPP TSG-SA2 Meeting #131, S2-1901636, Feb. 25-Mar. 1, 2019, Santa Cruz, Tenerife, Spain.
Ericsson, "5G bridge port allocation and mapping tables", 3GPP TSG-SA WG2 Meeting #134, S2-1907475, Sapporo, JP, Jun. 24-28, 2019.

* cited by examiner

INFORMATION TRANSMISSION METHOD AND COMMUNICATIONS DEVICE

CROSS-REFERENCE TO RELATED APPLICATIONS

The present application is a bypass continuation application of International Application No. PCT/CN2020/115895 filed on Sep. 17, 2020, which claims priority to Chinese Patent Application No. 201910888948.8 filed in China on Sep. 19, 2019, and to Chinese Patent Application No. 202010803276.9 filed in China on Aug. 11, 2020, which are incorporated herein by reference in their entireties.

TECHNICAL FIELD

Embodiments of the present invention relate to the field of wireless communications technologies, and in particular, to an information transmission method and a communications device.

BACKGROUND

Many vertical industries have demands for time-sensitive communication. In the industrial Internet, there are time-sensitive data, such as robot instructions, which need to be executed sequentially within a specified time. However, because network transmission resources are shared, and delays and jitters exist during data transmission, transmission of time-sensitive data cannot be supported. Therefore, time-sensitive networking is proposed to support transmission of the time-sensitive data.

In a time-sensitive network, data between a transmitting end and a receiving end of a time-sensitive data stream may be forwarded through one or more bridges. A transmission medium for the time-sensitive network may be a wireless connection. Therefore, how to support control and management of bridge-related information is a technical issue that needs to be urgently resolved.

SUMMARY

Embodiments of the present invention provide an information transmission method and a communications device.

According to a first aspect, an embodiment of the present invention provides an information transmission method, applied to a first communications device and including:
  obtaining first information; and
  sending the first information; where
  the first information includes bridge-related information of a first port pair;
  the first port pair includes a first port and a second port;
  the first port is a port of a first time-sensitive network translator (TSN translator, TT), and the second port is a port of a second TT; and
  the first TT is a first DS-TT (Device-side TSN translator, device-side time-sensitive network translator) and the second TT is a second DS-TT; or the first TT is a first NW-TT (Network-side TSN translator, network-side time-sensitive network translator) and the second TT is a second NW-TT.

According to a second aspect, an embodiment of the present invention provides an information transmission method, applied to a second communications device and including:
  obtaining second information; and
  sending the second information; where
  the second information includes TT-related information.

According to a third aspect, an embodiment of the present invention provides an information transmission method, applied to a third communications device and including:
  obtaining second information; and
  performing a first operation based on the second information, where the first operation includes at least one of the following:
  determining a first port pair;
  determining whether a first port and a second port of the first port pair are ports of a same TT;
  determining whether the first port and the second port of the first port pair satisfy a first condition;
  determining whether the first port and the second port of the first port pair satisfy a second condition; and
  determining information about a bridge delay of the first port pair; where the second information includes TT-related information; and
  the first port pair includes the first port and the second port.

According to a fourth aspect, an embodiment of the present invention provides an information transmission method, applied to a fourth communications device and including:
  obtaining third information; and
  sending the third information; where
  the third information includes information related to a third port;
  the third port is a port of an NW-TT or a DS-TT; and
  the sending the third information includes one of the following:
  selecting a port-associated tunnel and sending the third information by using signaling related to the selected port-associated tunnel; and
  selecting a port-unassociated or preconfigured communications device, and sending the third information to the selected communications device; where
  the port-associated tunnel includes one of the following: a tunnel associated with the third port, and a fifth tunnel; and
  the fifth tunnel includes one of the following: a tunnel associated with any port within a bridge, a tunnel associated with any port on a DS-TT side, and a tunnel associated with any port on an NW-TT side.

According to a fifth aspect, an embodiment of the present invention provides a communications device, and the communications device is a first communications device, including:
  an obtaining module, configured to obtain first information; and
  a sending module, configured to send the first information; where
  the first information includes bridge-related information of a first port pair;
  the first port pair includes a first port and a second port;
  the first port is a port of a first TT; and the second port is a port of a second TT; and
  the first TT is a first DS-TT, and the second TT is a second DS-TT; or the first TT is a first NW-TT, and the second TT is a second NW-TT.

According to a sixth aspect, an embodiment of the present invention provides a communications device, and the communications device is a second communications device, including:
  an obtaining module, configured to obtain second information; and a sending module, configured to send the second information; where the second information includes TT-related information.

According to a seventh aspect, an embodiment of the present invention provides a communications device, and the communications device is a third communications device, including:

an obtaining module, configured to obtain second information; and an execution module, configured to perform a first operation based on the second information, where the first operation includes at least one of the following:

determining a first port pair;

determining whether a first port and a second port of the first port pair are ports of a same TT;

determining whether the first port and the second port of the first port pair satisfy a first condition;

determining whether the first port and the second port of the first port pair satisfy a second condition; and determining information about a bridge delay of the first port pair; where the second information includes TT-related information; and the first port pair includes the first port and the second port.

According to an eighth aspect, an embodiment of the present invention provides a communications device, and the communications device is a fourth communications device, including:

an obtaining module, configured to obtain third information; and a sending module, configured to send the third information; where the third information includes information related to a third port;

the third port is a port of an NW-TT or a DS-TT; and the sending the third information includes one of the following:

selecting a port-associated tunnel and sending the third information by using signaling related to the selected port-associated tunnel; and selecting a port-unassociated or preconfigured communications device, and sending the third information to the selected communications device; where the port-associated tunnel includes one of the following: a tunnel associated with the third port, and a fifth tunnel; and the fifth tunnel includes one of the following: a tunnel associated with any port within a bridge, a tunnel associated with any port on a DS-TT side, and a tunnel associated with any port on an NW-TT side.

According to a ninth aspect, an embodiment of the present invention provides a communications device, including: a processor, a memory, and a computer program stored in the memory and capable of running on the processor, where when the computer program is executed by the processor, the steps of the information transmission method according to the first aspect are implemented, or the steps of the information transmission method according to the second aspect are implemented, or the steps of the information transmission method according to the third aspect are implemented, or the steps of the information transmission method according to the fourth aspect are implemented.

According to a tenth aspect, an embodiment of the present invention provides a computer-readable storage medium, where a computer program is stored in the computer-readable storage medium, and when the computer program is executed by a processor, the steps of the information transmission method according to the first aspect are implemented, or the steps of the information transmission method according to the second aspect are implemented, or the steps of the information transmission method according to the third aspect are implemented, or the steps of the information transmission method according to the fourth aspect are implemented.

BRIEF DESCRIPTION OF DRAWINGS

Other advantages and benefits will become apparent to those of ordinary skill in the art by reading detailed description of the exemplary embodiments below. The accompanying drawings are merely intended to illustrate the objectives of the preferred embodiments and are not intended to limit the present invention. Throughout the accompanying drawings, the same reference numerals represent the same components. In the accompanying drawings.

DETAILED DESCRIPTION OF EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In the specification and claims of this application, the term "include" and any other variants thereof are intended to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device. In addition, in the specification and claims, the use of "and/or" represents presence of at least one of the connected objects, for example, "A and/or B" indicates the following three cases: A alone, B alone, or both A and B.

In the embodiments of the present invention, the terms "an example" or "for example" are used to represent an example, an illustration, or a description. Any embodiment or design scheme described as "an example" or "for example" in the embodiments of the present invention should not be construed as being more preferred or advantageous than other embodiments or design schemes. To be precise, the words such as "an example" or "for example" are intended to present a related concept in a specific manner.

The following describes the embodiments of the present invention with reference to the accompanying drawings. An information transmission method and a communications device provided in the embodiments of the present invention may be applied to a wireless communications system. The wireless communications system may be a 5G system, an evolved long term evolution (eLTE) system, or a later evolved communications system.

In the embodiments of the present invention, time-sensitive may be also referred to as periodic deterministic. Time-sensitive communication may be also referred to as periodic deterministic communication. A time-sensitive data stream may be also referred to as a periodic deterministic data stream. An example of a time-sensitive networking technology is an IEEE TSN (Time SensitiveNetwork). In periodic deterministic communication, data is transmitted periodically at transmission intervals.

Figure 1:
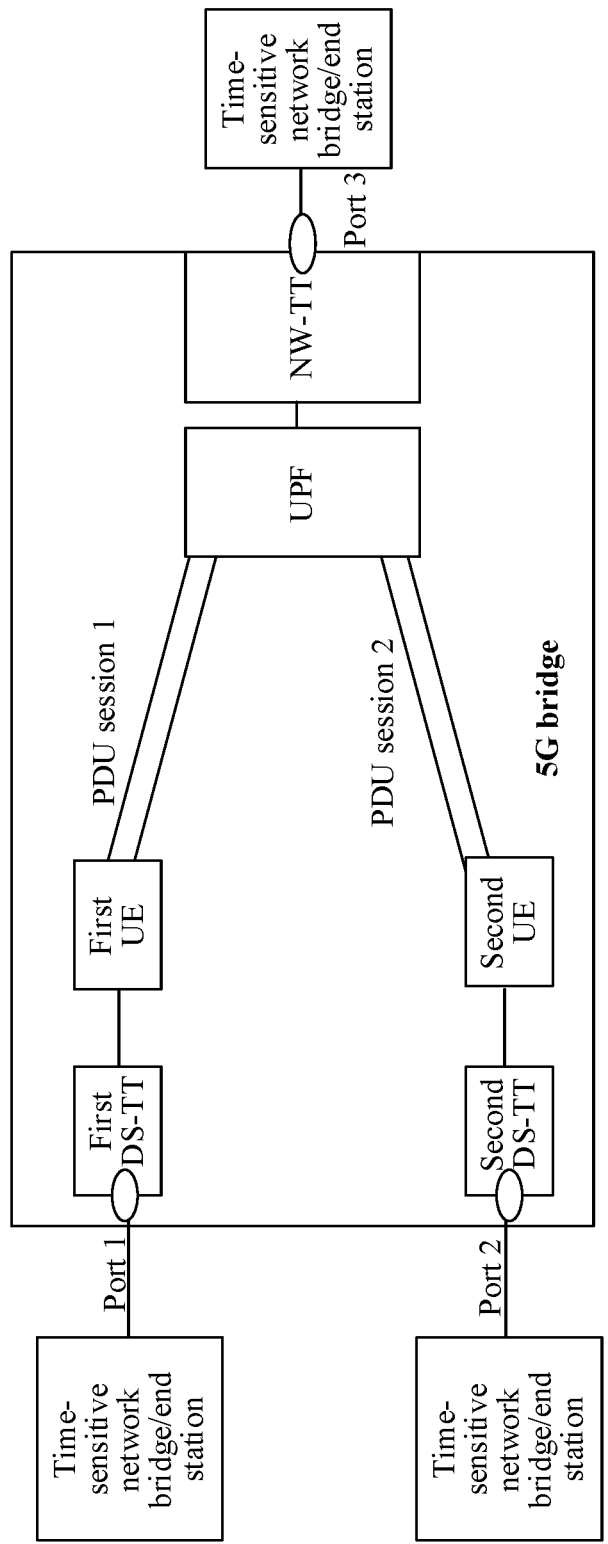
FIG. 1 is a schematic architectural diagram of an applicable wireless communications system according to an embodiment of the present invention.

FIG. 1 is a schematic architectural diagram of an applicable wireless communications system according to an embodiment of the present invention. In this embodiment of the present invention, a transmitting end of a time-sensitive data stream is referred to as talker, and a receiving end of the time-sensitive data stream is referred to as listener. Data may be forwarded through one or more bridges between the talker and the listener. An end station may be a talker or a listener. The bridge is responsible for data transmission between the talker and the listener.

A terminal (for example, User Equipment, UE), a time-sensitive translator, and a wireless communications network form a bridge (using a 5G bridge as an example hereinafter). For downlink data, a port of the device-side time-sensitive network translator (DS-TT) may be a data egress port, and a port of the network-side time-sensitive network translator (NW-TT) is a data ingress port. For uplink data, a port of the NW-TT may be a data ingress port, and a port of the second DS-TT is a data egress port. The terminal and the DS-TT may be co-located. A user-plane function (UPF) and the NW-TT may be co-located.

As shown in FIG. 1, one terminal may be connected to one or more DS-TTs, and one DS-TT may have one or more ports. One 5G bridge may have one UPF, and one or more ports may be enabled on the NW-TT of the UPF. The terminal may act as a port proxy of the DS-TT, to establish a protocol data unit (PDU) session with the UPF. With the PDU session, an association is established between a port on the DS-TT and a port on the NW-TT co-located with the UPF. The port on the DS-TT serves as a port of the 5G bridge.

The port of the DS-TT and the port of the NW-TT may each be connected to a TSN bridge and/or an end station. TSN bridges and/or end stations connected to the ports of the TTs may communicate with each other through the 5G bridge.

It should be noted that FIG. 1 is only an example of a schematic diagram, and a structure of the 5G bridge and a connection relationship between ports of the 5G bridge are not limited in the embodiments of the present invention.

To support implementation of a bridge formed by the terminal, time-sensitive translator, and wireless communications network, the following problems also need to be resolved.

Problem 1: As shown in a schematic diagram of FIG. 3, a port 1 and a port 2 are located on a same DS-TT. In this case, "5GS Bridge delay per port pair per traffic class" does not include a PDB, and the network does not need to perform calculation based on the PDB. Such delay needs to be reported to a CNC through the AF in the 5G bridge. However, such reporting is not supported currently.

Problem 2: As shown in a schematic diagram of FIG. 4, a port 1 is a port on a first DS-TT, and a port 2 is a port on a second DS-TT. The first DS-TT and the second DS-TT may be different DS-TTs that are connected to one UE in a same 5G bridge. In this case, "5GS Bridge delay per port pair per traffic class" does not include a PDB, and the network does not need to perform calculation based on the PDB. Such delay needs to be reported to a CNC through the AF in the 5G bridge. However, such reporting is not supported currently.

Problem 3: As shown in a schematic diagram of FIG. 5, a port 1 is a port on a first DS-TT, and a port 2 is a port on a second DS-TT. The first DS-TT and the second DS-TT may be different DS-TTs that are connected to different UEs in a same 5G bridge In this case, "5GS Bridge delay per port pair per traffic class (5GS Bridge delay per port pair per traffic class)" needs to include two PDBs and two UE-DS-TT residence times.

Firstly, the PDB is different from an existing PDB. The existing PDB is for a location of terminating an N6 interface; however, the PDB in the problem 3 is for internal local switching on the UPF, and therefore may have a shorter delay than the existing PDB.

Secondly, an existing 5G bridge delay may be generated by an SMF, a PCF, or an AF. However, first UE and second UE have different SMFs, and do not know a PDB status and a UE-DS-TT residence time of each other.

Problem 4: As shown in a schematic diagram of FIG. 6, when a port 3 and a port 4 are enabled as ports of the 5G bridge, no related DS-TT side ports are connected, that is, a PDU session for the port 3 or port 4 has not been established, and neither an SMF related to the UE nor a PCF associated with a PDU session of the UE exists. In this case, information related to a port pair of the port 3 and the port 4 cannot be sent by using signaling related to the PDU session. As a result, it is still unclear about whether and how to report the information related to the port pair of the port 3 and the port 4 to the CNC.

Problem 5: As shown in a schematic diagram of FIG. 6, when a port 3 is enabled as a port of the 5G bridge. On the one hand, no related DS-TT side ports are connected, that is, a PDU session for the port 3 has not been established, and neither an SMF related to the UE nor a PCF associated with a PDU session of the UE exists. In this case, information related to the port 3 cannot be sent by using signaling related to the PDU session. As a result, it is still unclear about whether and how to report the information related to the port 3 to the CNC. On the other hand, when the port 3 is enabled as a port of the 5G bridge, a plurality of DS-TT side ports may be connected, that is, there are a plurality of PDU sessions for the port 3. In this case, it is still unclear about signaling of which PDU session being used to send the information related to the port 3.

In the embodiments of the present invention, optionally, obtaining may be understood as acquiring from configuration, receiving, obtaining through receiving upon a request, obtaining through self-learning, obtaining through deduction based on non-received information, or obtaining through processing received information, which may be determined according to actual needs. This is not limited in the embodiments of the present invention. For example, when specific capability indication information transmitted by a device is not received, it can be deduced that the device does not support the capability.

Optionally, transmitting may include broadcasting, broadcasting through a system message, or returning a response after receiving the request.

Optionally, being preconfigured may indicate being default.

In an optional embodiment of the present invention, the port control information container may also be referred to as port management information container. The port control information container is a container carrying port control information (also referred to as port management information).

In an optional embodiment of the present invention, the port-related information includes: a port control information container. In an optional embodiment of the present invention, the port-related information may be construed as any one or more pieces of port-related information in bridge management (for example, port-related configuration information in bridge management in 802.1Q).

In an embodiment of the present invention, the port may be one of the following: an Ethernet port or an IP port.

In an optional embodiment of the present invention, the tunnel may include but is not limited to one of the following: a PDU session, a PDN connection, a QoS flow, a bearer, and an Internet Protocol Security (IPsec) tunnel, where the carrier may be an evolved radio access bearer (E-RAB), a radio access bearer (RAB), a data radio bearer (DRB), a signaling radio bearer (SRB), and so on.

In an optional embodiment of the present invention, the port pair includes two ports, for example, two ports of a same DS-TT, or two ports of different DS-TTs, or two ports of a same NW-TT, or two ports of different NW-TTs.

In an optional embodiment of the present invention, identification information of a TT includes at least one of the following: a MAC address of the TT and an IP address of the TT. For example, identification information of the DS-TT includes at least one of the following: a MAC address of the DS-TT and an IP address of the DS-TT. For example, identification information of the NW-TT includes at least one of the following: a MAC address of the NW-TT and an IP address of the NW-TT.

In an optional embodiment of the present invention, a bridge delay of a port pair may be a time required for a data packet to pass from one port to another port, and the two ports are two ports on a same bridge. It is easy to understand that the bridge delay may be a time required for the data packet to pass through the bridge.

For example, a first port pair includes a first port and a second port, and the bridge delay of the port pair may be a time required for a data packet to pass from the first port to the second port.

In an optional embodiment of the present invention, the bridge delay of the port pair may be a bridge delay per traffic class. Each port may support one or more traffic classes. Each traffic class has different transmission performance, so it is easy to understand that each traffic class on the egress port has a bridge delay of the port pair. The bridge delay of the port pair may be different for each traffic class.

To be specific, a bridge delay of a port may be a bridge delay for a specific traffic class. Certainly, bridge delays for different traffic classes may be the same or different.

In an optional embodiment of the present invention, a TT port, a port on a TT, a port of a TT side, and a TT side port all represent the same meaning and can be used interchangeably.

In an optional embodiment of the present invention, a port-associated tunnel is generally associated with a port of one DS-TT and a port of one NW-TT. It is easy to understand that a tunnel associated with the port of the DS-TT and a tunnel associated with the port of the NW-TT are a same tunnel. With establishment of the tunnel (such as a PDU session), the port of the DS-TT acts as one port of the bridge, or an association is established between the port of the DS-TT and the port of the NW-TT.

In an optional embodiment of the present invention, the wireless communications network may be referred to as a network for short.

In an embodiment of the present invention, the wireless communications network may be at least one of the following: a public network and a non-public network.

In an embodiment of the present invention, the non-public network is an abbreviation of the non-public network. The non-public network may be referred to as one of the following: a non-public communications network. The non-public network may include at least one of the following deployment manners: non-public network as a stand-alone network (for example, an SNPN) and non-public network as a non-stand-alone network (for example, a closed access group (CAG)). In an embodiment of the present invention, the non-public network may include or be referred to as a private network. The private network may be referred to as one of the following: a private communications network, a private network, a local area network (LAN), a private virtual network (PVN), an isolated communications network, a dedicated communications network, or other names. It should be noted that the naming manner is not specifically limited in the embodiments of the present invention.

In an embodiment of the present invention, the public network (for example, a PLMN) is an abbreviation of the public network. The public network may be referred to as one of the following: a public communications network or other names. It should be noted that the naming manner is not specifically limited in the embodiments of the present invention.

In an optional embodiment of the present invention, the communications device may include at least one of the following: a communications network element and a terminal.

In an embodiment of the present invention, the communications network element may include at least one of the following: a core-network network element and a radio access network network element.

In the embodiments of the present invention, a core-network network element (CN network element) may include but is not limited to at least one of the following: a core network device, a core network node, a core network function, a core-network network element, a mobility management entity (MME), an access mobility management function (AMF), a session management function (SMF), a user plane function (UPF), a serving gateway (SGW), a PDN gateway (PDN-GW), a policy control function (PCF), a policy and charging rules function unit (PCRF), a GPRS serving support node (SGSN), a gateway GPRS support node (GGSN), a unified data management (UDM), a unified data repository (UDR), a home subscriber server (HSS), an application function (AF), and a centralized network configuration (CNC).

In the embodiments of the present invention, a radio access network (RAN) network element may include but is not limited to at least one of the following: a radio access network device, a radio access network node, a radio access network function, a radio access network unit, a third generation partnership project (3GPP) radio access network, a non-3GPP radio access network, a centralized unit (CU), a distributed unit (DU), a base station, an evolved NodeB (eNB), a 5G base station (gNB), a radio network controller (RNC), a base station (NodeB), a non-3GPP interworking function (N3IWF), an access controller (AC) node, an access point (AP) device, a wireless local area network (WLAN) node, or an N3IWF.

The base station may be a base transceiver station (BTS) in a Global System for Mobile Communications (GSM) or Code Division Multiple Access (CDMA) network, may be a base station (NodeB) in wideband Code Division Multiple Access (WCDMA), or may be an evolved NodeB (eNB or e-NodeB), in LTE, or a 5G NodeB (gNB). This is not limited in the embodiments of the present invention.

In the embodiments of the present invention, the UE is a terminal. The terminal may include a relay supporting terminal functions and/or a terminal supporting relay functions. The terminal may also be referred to as a terminal device or user equipment (UE). The terminal may be a terminal-side device such as a mobile phone, a tablet computer, a laptop computer, a personal digital assistant (PDA), a mobile Internet device (MID), a wearable device, or an in-vehicle device. It should be noted that a specific type of the terminal is not limited in the embodiments of the present invention.

The method and the communications device provided in the embodiments of the present invention may be applied to a wireless communications system. The wireless communications system may be a fifth-generation (5G) mobile communications system, or an evolved packet system (EPS), or a later evolved communications system. The wireless communications system in the embodiments of the present invention may be a fifth generation mobile communications network (5GS) or an LTE network. The following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The following describes the information transmission method in the embodiments of the present invention.

Figure 2:
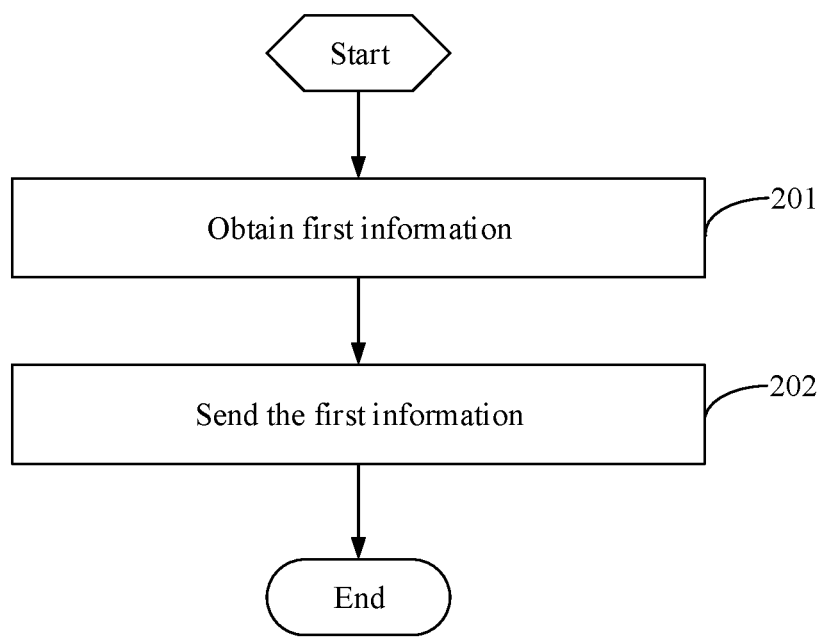
FIG. 2 is a flowchart of an information transmission method according to an embodiment of the present invention.

Referring to FIG. 2, an embodiment of the present invention provides an information transmission method, applied to a first communications device. The first communications device includes, but is not limited to, a terminal, a TT (such as one of the following: a DS-TT, an NW-TT, a first DS-TT, a second DS-TT, a first NW-TT, and a second NW-TT), a CN network element (such as one of the following: an SMF, a UPF, a PCF, an NEF, and an AF), and a RAN network element. The method includes the following steps.

Step 201: Obtain first information.

Step 202: Send the first information.

The first information includes bridge-related information of a first port pair;
the first port pair includes a first port and a second port;
the first port is a port of a first time-sensitive network translator TT, and the second port is a port of a second TT; and
the first TT is a first DS-TT (DS-TT is a device-side time-sensitive network translator), and the second TT is a second DS-TT; or the first TT is a first NW-TT (NW-TT is a network-side time-sensitive network translator), and the second TT is a second NW-TT.

In an implementation, the first port and the second port are ports of one bridge (such as a 5G bridge). For example, a tunnel (such as a PDU session) of the first port and a tunnel (such as a PDU session) of the second port are connected to a same gateway (such as a UPF, where the UPF and the NW-TT are co-located).

In an implementation, the first port is an ingress port, and the second port is an egress port. That is, data is received through the first port and is sent out through the second port.

Optionally, the bridge-related information of the first port pair includes at least one of the following:
a bridge delay of the first port pair, port-related information of the first port, port-related information of the second port, and a traffic class associated with the bridge delay of the first port pair.

In an implementation, the bridge delay of the first port pair may be a time required for a data packet to pass from the first port to the second port.

In an implementation, the traffic class associated with the bridge delay of the first port pair may be a traffic class supported by a port acting as an egress port in the first port pair. For example, the data is received through the first port and is sent out through the second port. In this case, the traffic class associated with the bridge delay of the first port pair is a traffic class supported by the second port.

Further, the port-related information includes at least one of the following: identification information of a port, and TT-related information of a TT in which the port is located.

In an implementation, the TT-related information of the TT in which the port is located includes DS-TT related information of a DS-TT to which the port belongs. In another implementation, the TT-related information of the TT in which the port is located includes NW-TT related information of an NW-TT to which the port belongs. Further, the DS-TT related information includes at least one of the following: identification information of the DS-TT, and index information of the DS-TT. Further, the NW-TT related information includes at least one of the following: identification information of the NW-TT, and index information of the NW-TT.

Further, port-related information of the first port includes at least one of the following: identification information of the first port, and TT-related information of the first TT.

Further, port-related information of the second port includes at least one of the following: identification information of the second port, and TT-related information of the second TT.

Further, the TT-related information includes at least one of the following: identification information of a TT, and index information of the TT. Further, the TT-related information of the first TT includes at least one of the following: identification information of the first TT and index information of the first TT. Further, the TT-related information of the second TT includes at least one of the following: identification information of the second TT and index information of the second TT.

In another implementation, the port identification information may include at least one of the following: a MAC address of a port and an index of the port. A TT of the port indicates a TT on which the port is located, that is, a TT to which the port belongs, where the TT may be a DS-TT or an NW-TT.

Optionally, the sending the first information includes one of the following:
  selecting a port-associated tunnel and sending the first information by using signaling related to the port-associated tunnel; and
  selecting a port-unassociated or preconfigured communications device, and sending the first information to the selected communications device; where
  the port-associated tunnel includes one of the following: a first tunnel, a second tunnel, a third tunnel, and a tunnel related to a DS-TT side port;
  the first tunnel is a tunnel associated with the first port;
  the second tunnel is a tunnel associated with the second port; and
  the third tunnel includes one of the following: a tunnel associated with any port within a bridge (for example, a bridge in which the first port and/or the second port is located), a tunnel associated with any port on a DS-TT side (such as one of the following: a DS-TT in which the first port and/or the second port is located, and any DS-TT in the bridge in which the first port and/or the second port is located), and a tunnel associated with any port on an NW-TT side (such as one of the following: an NW-TT in which the first port and/or the second port is located, and any NW-TT in the bridge in which the first port and/or the second port is located).

In an implementation, the bridge may be a bridge to which the first port and/or the second port belongs. Any port in the bridge may be any port of the bridge, or any port other than the first port and/or the second port in the bridge.

In an implementation, any port on the DS-TT side may be any port other than the first port and/or the second port on the DS-TT side. In an implementation, any port on the NW-TT side may be any port other than the first port and/or the second port on the NW-TT side.

(1) Optionally, the selecting a port-associated tunnel and sending the first information by using signaling related to the port-associated tunnel includes one of the following:
  if a first condition is satisfied, waiting until the first tunnel and/or the second tunnel is established, and sending the first information by using signaling related to the first tunnel or signaling related to the second tunnel;
  if a first condition is satisfied, sending the first information in an establishment process of the first tunnel and/or the second tunnel by using signaling related to the first tunnel or signaling related to the second tunnel;
  if a second condition is satisfied, sending the first information by using setup request signaling of the first tunnel or setup request signaling of the second tunnel; or
  if a third condition is satisfied, selecting any one of the first tunnels or any one of the second tunnels and sending the first information; where
  the first condition includes at least one of the following: the first tunnel and the second tunnel do not exist;
  the second condition includes at least one of the following: the first tunnel and the second tunnel do not exist, and the first TT and the second TT are both DS-TTs; and
  the third condition includes at least one of the following: there are a plurality of first tunnels and/or second tunnels, and the first TT and the second TT are both NW-TTs.

In this implementation, it may be specifically construed as constituting a limitation on selecting the first tunnel or the second tunnel and sending the first information by using the signaling related to the first tunnel or the signaling related to the second tunnel. That is, the selecting the first tunnel or the second tunnel and sending the first information by using the signaling related to the first tunnel or the signaling related to the second tunnel includes one of the following:
  if a first condition is satisfied, waiting until the first tunnel and/or the second tunnel is established, and sending the first information by using signaling related to the first tunnel or signaling related to the second tunnel;
  if a first condition is satisfied, sending the first information in an establishment process of the first tunnel and/or the second tunnel by using signaling related to the first tunnel or signaling related to the second tunnel;
  if a second condition is satisfied, sending the first information by using setup request signaling of the first tunnel or setup request signaling of the second tunnel; or
  if a third condition is satisfied, selecting any one of the first tunnels or any one of the second tunnels and sending the first information; where
  the first condition includes at least one of the following: the first tunnel and the second tunnel do not exist;
  the second condition includes at least one of the following: the first tunnel and the second tunnel do not exist, and the first TT and the second TT are both DS-TTs; and
  the third condition includes at least one of the following: there are a plurality of first tunnels and/or second tunnels, and the first TT and the second TT are both NW-TTs.

(2) Optionally, the selecting a port-associated tunnel and sending the first information by using signaling related to the port-associated tunnel includes:
  if a fourth condition is satisfied, selecting the third tunnel, and sending the first information by using signaling related to the third tunnel; where
  the fourth condition includes at least one of the following: the first tunnel and the second tunnel do not exist; and the first TT and the second TT are both NW-TTs, or the first TT and the second TT are both DS-TTs.

In this implementation, it can be construed as constituting a limitation on selecting the third tunnel and sending the first information by using the signaling related to the third tunnel.

That is, the selecting the third tunnel and sending the first information by using the signaling related to the third tunnel includes:
if a fourth condition is satisfied, selecting the third tunnel, and sending the first information by using signaling related to the third tunnel; where
the fourth condition includes at least one of the following:
the first tunnel and the second tunnel do not exist; and
the first TT and the second TT are both NW-TTs, or the first TT and the second TT are both DS-TTs.

It is easy to understand that ports of a plurality of DS-TTs may each have a tunnel to a port of the same NW-TT. Therefore, the NW-TT may have a plurality of tunnels associated with the NW-TT.

In an implementation, any port within the bridge includes at least one of the following: any port on the DS-TT side, and any port on the NW-TT side.

(3) Optionally, the selecting a port-unassociated or preconfigured communications device, and sending the first information to the selected communications device includes:
if a fifth condition is satisfied, selecting a port-unassociated or preconfigured communications device, and sending the first information to the selected communications device; where
the fifth condition includes at least one of the following:
the first tunnel and the second tunnel do not exist; the first TT and the second TT are both NW-TTs; and the third tunnel does not exist.

In an implementation, the port-unassociated communications device may be one of the following:
a communications device unassociated with any port of the bridge (for example, a bridge in which the first port and/or the second port is located);
a communications device unassociated with the first port and/or the second port; and
a communications device unassociated with any port.

In an implementation, the preconfigured communications device may be a preset communications device or a communications device prescribed in a protocol.

(1) In an implementation, the first port is a port on the first DS-TT, and the second port is a port on the second DS-TT. However, there may be only one UPF in a 5G bridge. In this case, the first tunnel may be associated with the first port and is a tunnel established between the terminal and the UPF; and the second tunnel may be associated with the second port and is a tunnel established between the terminal and the UPF.

(2) In an implementation, sending the first information through the tunnel (the first tunnel or the second tunnel) means sending, by using signaling related to the tunnel, the first information to a communications device (SMF) related to the tunnel, for example, sending the first information by using a first PDU session, specific to the first port, between the first DS-TT and the UPF or by using a second PDU session, specific to the second port, between the second DS-TT and the UPF, which may be specifically selected by the first communications device.

(3) In another implementation, the first port and the second port are ports on the NW-TT. When a port on the NW-TT co-located with the UPF is enabled, if the terminal has not established a tunnel for the port on the DS-TT, in an implementation, a preconfigured or port-unassociated communications device (for example, an SMF) may be selected. Because the SMF is unassociated with the tunnel, the PCF is also unassociated with the tunnel. The SMF also needs to select a preconfigured or port-unassociated PCF, and sends the first information to the PCF.

Optionally, in a case that the first information is sent by using signaling related to a port-associated tunnel:
the first information is included in a port control information container of the signaling related to the port-associated tunnel, for sending;
or
the first information is included in the signaling related to the port-associated tunnel, and is sent outside a port control information container.

In an implementation, the tunnel-associated signaling may be PDU session signaling.

In an implementation, the first information may be included in the port control information container and sent directly to the AF.

In an implementation, the first information may be is sent outside a port control information container to the SMF, and then is sent to the PCF by the SMF. For example, the SMF or PCF generates bridge delays for all port pairs of the bridge, and send the bridge delays to the AF.

Optionally, the obtaining first information includes:
obtaining the first information from another device;
or
obtaining, by the first communications device, the first information through measurement and/or calculation.

(1) In an implementation, when the first communications device is the first DS-TT or second DS-TT, one of the following may be performed to obtain the first information:
obtaining the first information through measurement by the first communications device.

It is easy to understand that when the first port and the second port are two ports on the first DS-TT, and the first communications device is the first DS-TT, the first DS-TT may obtain the first information through measurement.

It is easy to understand that when the first port and the second port are two ports on the second DS-TT, and the first communications device is the second DS-TT, the first DS-TT may obtain the first information through measurement.

It is easy to understand that when the first port and the second port are two ports on the first DS-TT and the second DS-TT, and the first communications device is the first DS-TT or the second DS-TT, the first communications device may obtain the first information through measurement.

(2) In an implementation, when the first communications device is a terminal, one of the following may be performed to obtain the first information:
receiving the first information from the first DS-TT;
receiving the first information from the second DS-TT;
receiving the first information from the first DS-TT and the second DS-TT; and
obtaining, by the first communications device, the first information through calculation.

It is easy to understand that when the first port and the second port are two ports on the first DS-TT, and when the first communications device is a terminal, the first information may be received from the first DS-TT.

It is easy to understand that when the first port and the second port are ports on the first DS-TT and the second DS-TT respectively, and when the first communications device is a terminal, one of the following may be performed:
receiving the first information from the first DS-TT;
receiving the first information from the second DS-TT; and
calculating a bridge delay of the first port pair based on a delay between the UE and the first port and a delay between the UE and the second port.

(3) In an implementation, when the first communications device is an NW-TT or a UPF, one of the following may be performed to obtain the first information:
  obtaining the first information through measurement by the first communications device.
In an implementation, in a 5G bridge, the NW-TT and the UPF may be co-located.

(4) In an implementation, when the first communications device is an SMF, one of the following may be performed to obtain the first information:
  receiving the first information from the terminal; and
  obtaining, by the first communications device, the first information through calculation.

(5) In an implementation, when the first communications device is a PCF, the following may be performed to obtain the first information:
  receiving the first information from the SMF.

In an implementation, when the first communications device is an AF, the following may be performed to obtain the first information:
  receiving the first information from the terminal, the SMF, or the PCF.

Optionally, the first communications device includes but is not limited to one of the following: a first DS-TT, a second DS-TT, a terminal, a first NW-TT, a second NW-TT, a UPF, an SMF, a PCF, an NEF, and an AF.

Optionally, the sending first information includes:
  sending the first information to at least one of the following: a terminal, an SMF, a PCF, an NEF, an AF, and a CNC.

(1) In an implementation, when the first communications device is the first DS-TT or second DS-TT, the first information may be sent to the terminal.

(2) In an implementation, when the first communications device is the first NW-TT or second NW-TT or the UPF, the first information may be sent to the AF or the SMF. When the first information is included in the port control information container, the first information may be sent to the AF. The SMF and the PCF on the way merely play a forwarding role. When the first information is not included in the port control information container, the first information may be sent to the SMF.

(3) In an implementation, when the first communications device is a terminal, the first information may be sent to the AF or the SMF. When the first information is included in the port control information container, the first information may be sent to the AF. The SMF and the PCF on the way merely play a forwarding role. When the first information is not included in the port control information container, the first information may be sent to the SMF.

(4) In an implementation, when the first communications device is an SMF, the first information may be sent to the PCF.

(5) In an implementation, when the first communications device is a PCF, the first information may be sent to the AF. The PCF may send the first information to the AF through the NEF or not through the NEF.

(6) In an implementation, when the first communications device is an AF, the first information may be sent to the CNC.

Optionally, the first DS-TT and the second DS-TT are a same DS-TT; or
  the first DS-TT and the second DS-TT are different DS-TTs.

Figure 3:
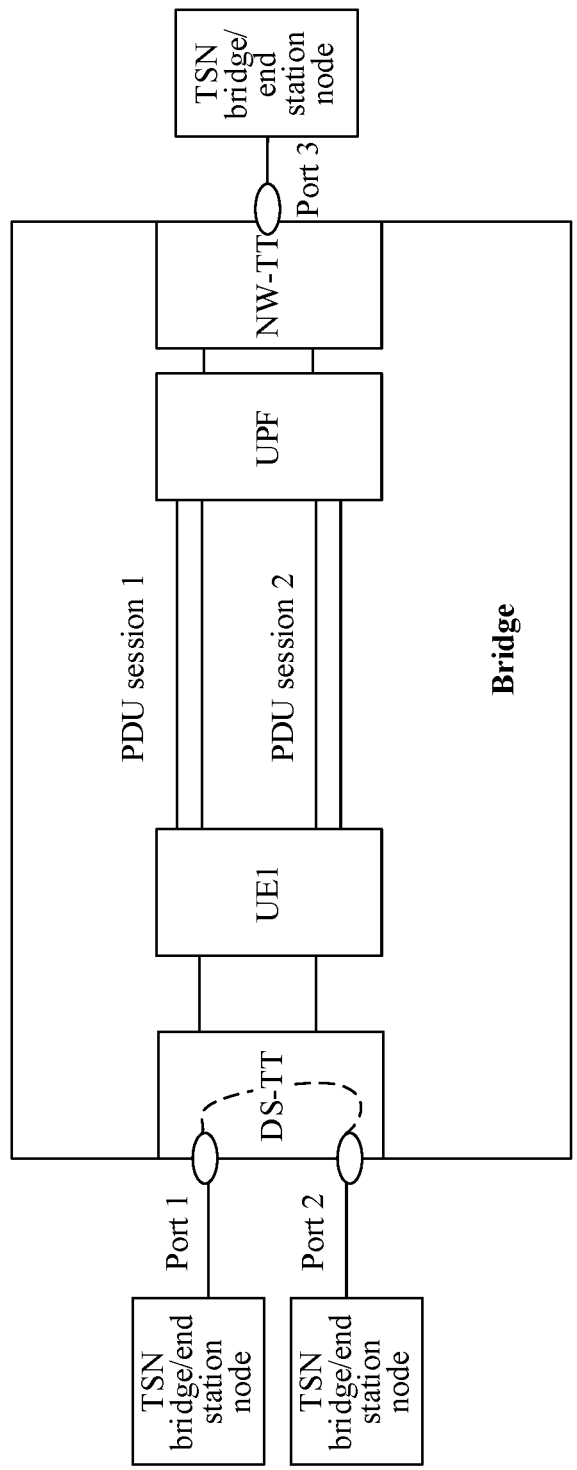
FIG. 3 is a schematic diagram of an application scenario according to an embodiment of the present invention.

In an implementation, for example, as shown in FIG. 3, the first port (port 1 in the figure) and the second port (port 2 in the figure) are ports of the same DS-TT.

Figure 4:
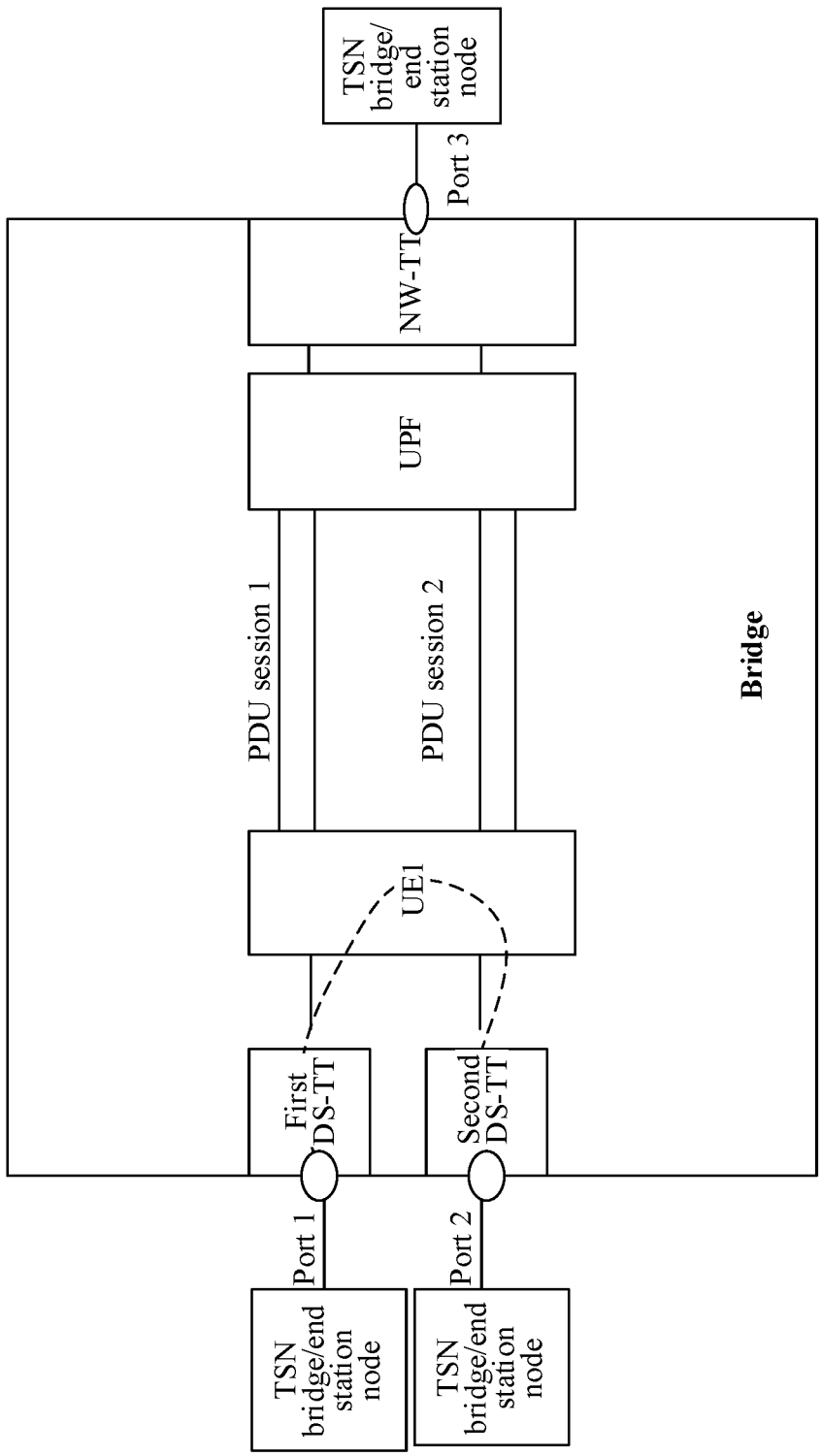
FIG. 4 is a schematic diagram of another application scenario according to an embodiment of the present invention.
Figure 5:
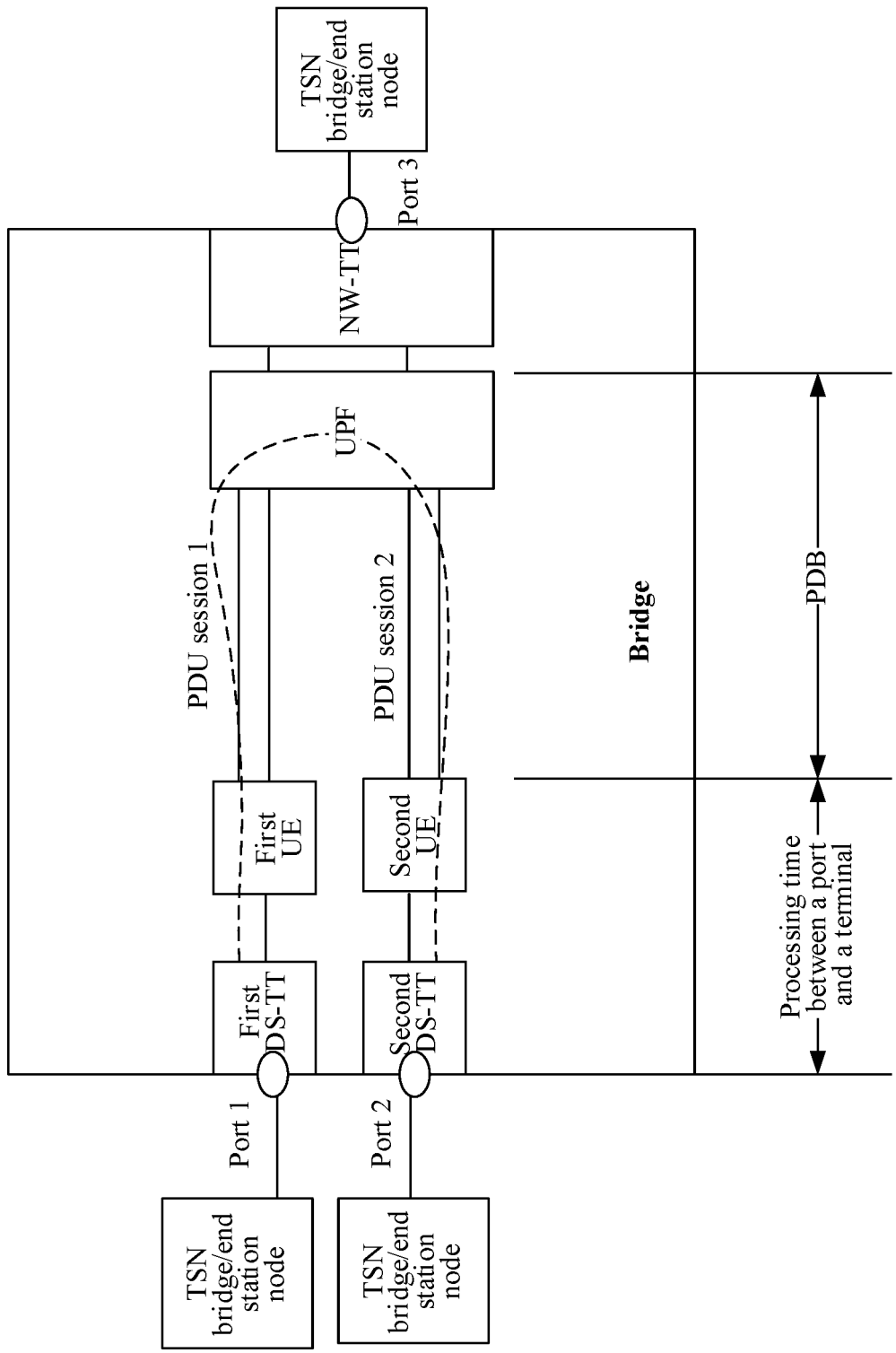
FIG. 5 is a schematic diagram of another application scenario according to an embodiment of the present invention.

In an implementation, for example, as shown in FIG. 4, the first port (port 1 in the figure) and the second port (port 3 in the figure) are ports of different DS-TTs. In addition, these two DS-TTs may be connected to a same terminal, or as shown in FIG. 5, two DS-TTs may be connected to two different terminals.

Optionally, the first NW-TT and the second NW-TT are a same NW-TT; or
  the first NW-TT and the second NW-TT are different NW-TTs.

Figure 6:
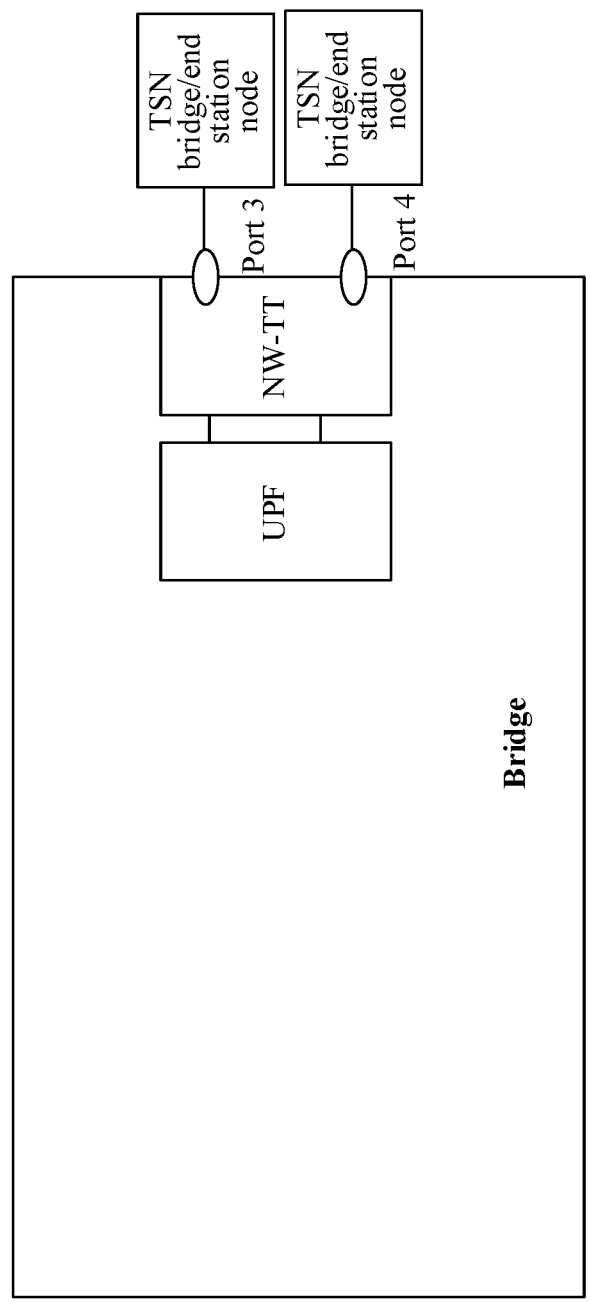
FIG. 6 is a schematic diagram of another application scenario according to an embodiment of the present invention.

In an implementation, for example, as shown in FIG. 6, the first port (port 3 in the figure) and the second port (port 4 in the figure) are ports of the same NW-TT.

In this embodiment of the present invention, the first information may be sent, that is, the bridge-related information of the port pair whose input and output are of the same type (for example, the input and output are both ports on the DS-TT, or the input and output are both ports on the NW-TT) may be sent, so as to support management and control of information related to the time-sensitive bridge (which may be referred to as supporting management and control of the bridge), and further to support time-sensitive communication performed through the bridge between devices connected to the bridge.

Figure 7:
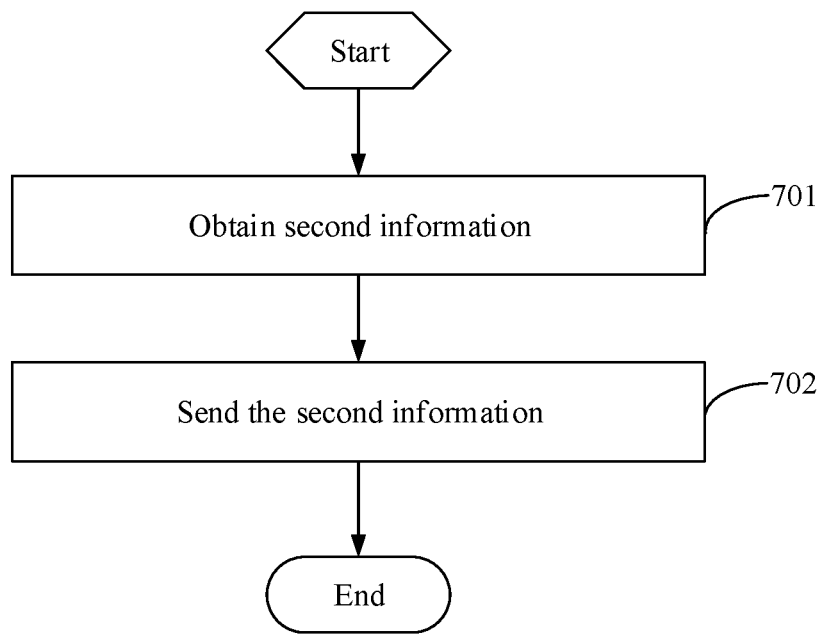
FIG. 7 is a flowchart of another information transmission method according to an embodiment of the present invention.

Referring to FIG. 7, an embodiment of the present invention further provides an information transmission method, applied to a second communications device. The second communications device includes, but is not limited to, a DS-TT, an NW-TT, a CN network element (such as one of the following: an SMF, a UPF, a PCF, an NEF, and an AF), and a RAN network element. The method includes the following steps.

Step 701: Obtain second information.
Step 702: Send the second information.

The second information includes TT-related information.

Optionally, the TT-related information is TT-related information of a TT in which the N-th port is located. The N-th port is a port on the TT, such as a first port or a second port. In an implementation, the first port is a port of a bridge (for example, a 5G bridge). The TT may be an NW-TT or a DS-TT.

In an implementation, N may be an integer value such as 1, 2, and/or 3.

Figure 8:
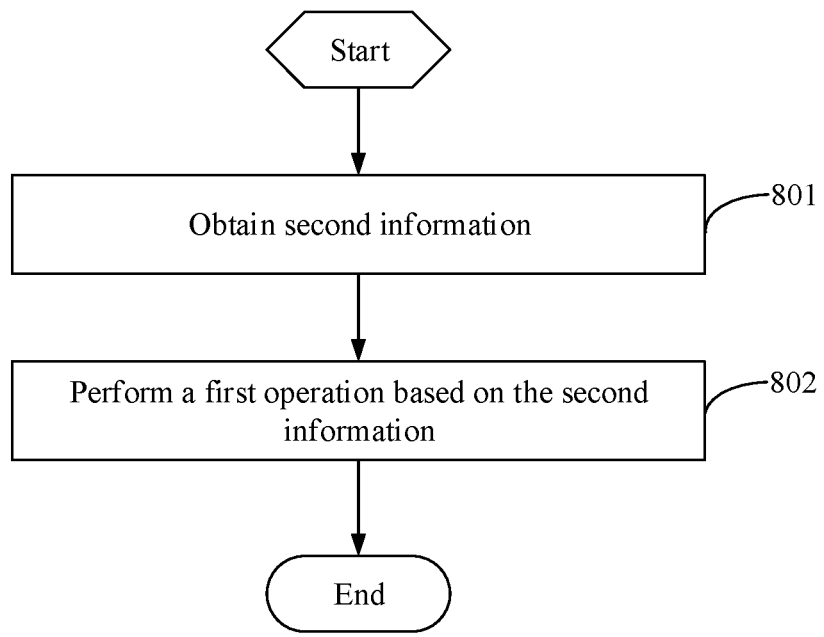
FIG. 8 is a flowchart of another information transmission method according to an embodiment of the present invention.

In another implementation, the N-th port is one or more ports of the bridge. The N-th port includes a first port and/or a second port. The first port and the second port are shown in the embodiment of FIG. 8.

Optionally, the TT-related information includes at least one of the following: index information of a TT, and identification information of the TT. The TT-related information may be DS-TT related information or NW-TT related information. The DS-TT related information includes at least one of the following: index information of a DS-TT, and identification information of the DS-TT. The NW-TT related information includes at least one of the following: index information of an NW-TT, and identification information of the NW-TT.

In an implementation, the second information may be used for identifying whether a pair of ports is two ports on the same TT or two ports on different TTs.

In an implementation, the second information may be used for identifying whether a pair of ports is ports on the first TT and the second TT, and for identifying whether the first TT and the second TT are connected to a same terminal or different terminals. In this case, the first TT is a first DS-TT; and the second TT is a second DS-TT.

Optionally, the sending the second information includes one of the following:
- selecting a port-associated tunnel and sending the second information by using signaling related to the port-associated tunnel; and
- selecting a port-unassociated (unassociated with any port) or preconfigured communications device (such as one of the following: an SMF and a PCF), and sending the second information to the selected communications device.

The port-associated tunnel includes one of the following: a tunnel associated with the N-th port, and a fourth tunnel.

The fourth tunnel includes one of the following: a tunnel associated with any port within a bridge (for example, a bridge in which the N-th port is located), a tunnel associated with any port on a DS-TT side (such as one of the following: a DS-TT in which the N-th port is located, and any DS-TT in the bridge in which the N-th port is located), and a tunnel associated with any port on an NW-TT side (such as one of the following: an NW-TT in which the N-th port is located, and any NW-TT in the bridge in which the N-th port is located).

In an implementation, the bridge may be a bridge to which the N-th port belongs. Any port in the bridge may be any port other than the N-th port in the bridge.

In an implementation, any port on the DS-TT side may be any port other than the N-th port on the DS-TT side. In an implementation, any port on the NW-TT side may be any port other than the N-th port on the NW-TT side.

In an implementation, the port-associated tunnel is a tunnel associated with the N-th port.

In an implementation, the port-unassociated communications device may be one of the following:
- a communications device unassociated with any port;
- a communications device unassociated with any port of a bridge in which the N-th port is located; and
- a communications device unassociated with the N-th port.

In an implementation, the preconfigured communications device may be a preset communications device or a communications device prescribed in a protocol.

(1) Optionally, the selecting a port-associated tunnel and sending the second information by using signaling related to the port-associated tunnel includes:
- if a first condition is satisfied, waiting until the tunnel associated with the N-th port is established, and sending the second information by using signaling related to the tunnel associated with the N-th port; or
- if a first condition is satisfied, sending the second information in an establishment process of the tunnel associated with the N-th port by using signaling related to the tunnel associated with the N-th port; or
- if a second condition is satisfied, sending the second information by using setup request signaling of the tunnel associated with the N-th port; or
- if a third condition is satisfied, selecting any one of tunnels associated with the N-th port and sending the second information by using signaling related to the selected tunnel; where
- the first condition includes at least one of the following: the tunnel associated with the N-th port does not exist;
- the second condition includes at least one of the following: the tunnel associated with the N-th port does not exist; and the TT in which the N-th port is located is a DS-TT; and
- the third condition includes at least one of the following: there are a plurality of tunnels associated with the N-th port; and the TT in which the N-th port is located is an NW-TT.

(2) Optionally, the selecting a port-associated tunnel and sending the second information by using signaling related to the port-associated tunnel includes:
- if a fourth condition is satisfied, selecting the fourth tunnel, and sending the second information by using signaling related to the fourth tunnel; where
- the fourth condition includes at least one of the following: the tunnel associated with the N-th port does not exist; the TT in which the N-th port is located is an NW-TT; and the TT in which the N-th port is located is a DS-TT.

(3) Optionally, the selecting a port-unassociated or preconfigured communications device, and sending the second information to the selected communications device includes:
- if a fifth condition is satisfied, selecting a port-unassociated or preconfigured communications device, and sending the second information to the selected communications device; where
- the fifth condition includes at least one of the following: the tunnel associated with the N-th port does not exist; the TT in which the N-th port is located is an NW-TT; and the fourth tunnel does not exist.

In an implementation, the port is a port of the DS-TT side. There is only one UPF in one 5G bridge, and then the port-associated channel is a tunnel that is associated with the port and established between the terminal and the UPF. Sending the second information through the tunnel means sending the second information by using signaling related to the tunnel (session management related information) to the communications device (SMF) associated with the tunnel.

In another implementation, the port is a port of the NW-TT side. When a port on the NW-TT co-located with the UPF is enabled, if the terminal has not established a tunnel for the port on the DS-TT, in an implementation, a preconfigured or port-unassociated communications device (for example, an SMF) may be selected. Because the SMF is unassociated with the tunnel, the PCF is also unassociated with the tunnel. The SMF also needs to select a preconfigured or port-unassociated PCF and sends the second information to the PCF. If the fourth tunnel is present, signaling related to any fourth tunnel may be selected for sending the second information.

Optionally, in a case that the second information is sent by using signaling related to a port-associated tunnel:
- the second information is sent by being included in a port control information container of the signaling related to the port-associated tunnel;
or
- the second information is included in the signaling related to the port-associated tunnel, and is sent outside a port control information container.

In an implementation, the SMF or PCF may be responsible for calculating the bridge delay of the port pair. In this case, the second information needs to be not included in a port control information container, so as to be identified by the SMF or the PCF.

In another implementation, the AF may be responsible for calculating the bridge delay of the port pair, and the second information may be included in the port control information container. It is easy to understand that, in this way, the communications device, such as the SMF and the PCF, merely performs transparent transmission and does not need to implement understanding.

Optionally, the second communications device includes but is not limited to one of the following: a first DS-TT, a second DS-TT, a terminal, a first NW-TT, a second NW-TT, a UPF, an SMF, a PCF, an NEF, and an AF.

Optionally, the sending second information includes:
sending the second information to at least one of the following: a terminal, an SMF, a PCF, an NEF, an AF, and a CNC.

(1) In an implementation, when the second communications device is a DS-TT, the second information may be sent to the terminal.

(2) In an implementation, when the second communications device is an NW-TT or a UPF, the second information may be sent to the AF or the SMF. When the second information is included in the port control information container, the second information may be sent to the AF. The SMF and the PCF on the way merely play a forwarding role. When the second information is not included in the port control information container, the second information may be sent to the SMF and/or PCF.

(3) In an implementation, when the second communications device is a terminal, the second information may be sent to the AF or the SMF. When the second information is included in the port control information container, the second information may be sent to the AF. The SMF and the PCF on the way merely play a forwarding role. When the second information is not included in the port control information container, the second information may be sent to the SMF.

(4) In an implementation, when the second communications device is an SMF, the second information may be sent to the PCF.

(5) In an implementation, when the second communications device is a PCF, the second information may be sent to the AF. The PCF may send the second information to the AF through the NEF or not through the NEF.

(6) In an implementation, when the second communications device is an AF, the second information may be sent to the CNC.

In this embodiment of the present invention, sending the second information can implement transmission of more bridge-related information, so as to support management and control of information related to the time-sensitive bridge, and further to support time-sensitive communication performed through the bridge by devices connected to the bridge.

Referring to FIG. 8, an embodiment of the present invention further provides an information transmission method, applied to a third communications device. The third communications device includes, but is not limited to, a DS-TT, an NW-TT, a CN network element (such as one of the following: an SMF, a UPF, a PCF, an NEF, and an AF), and a RAN network element. The method includes the following steps.

Step 801: Obtain second information.

Step 802: Perform a first operation based on the second information, where the first operation includes at least one of the following: determining a first port pair;
determining whether a first port and a second port of the first port pair are ports of a same TT;
determining whether the first port and the second port of the first port pair satisfy a first condition;
determining whether the first port and the second port of the first port pair satisfy a second condition; and
determining information about a bridge delay of the first port pair; where the second information includes TT-related information; and the first port pair includes the first port and the second port.

In an implementation, the first port pair is a port pair of a bridge.

In an implementation, the determining a first port pair is intended to determine the bridge delay of the first port pair.

Optionally, the determining a first port pair includes:
determining that the first port pair excludes a port pair of two ports on the same TT.

In an implementation, the two ports on the same TT are, for example, two ports on the same NW-TT, or two ports on the same DS-TT. In an implementation, for the first port pair, it is determined based on the TT-related information of a TT in which the ports are located whether the two ports are on the same TT. It is easy to understand that devices behind the same TT may not need to access, through the TT (DS-TT), the bridge associated with the TT, for routing. Therefore, during forming of the port pair of the bridge or forming of the bridge delay of the port pair, the bridge delay of the port pair of the two ports on the same TT does not need to be considered.

Further, that the second information includes TT-related information may be TT-related information of a TT in which the first port is located and/or TT-related information of a TT in which the second port is located. The TT-related information includes at least one of the following: index information of a TT, and identification information of the TT.

In an implementation, determining the information about the bridge delay of the first port pair may be determining the bridge delay of the first port pair or information related to the bridge delay of the first port pair.

In an implementation, for the first port pair, reference may be made to the first port pair described in the embodiment shown in FIG. 2, and details are not described herein again.

Optionally, the determining information about a bridge delay of the first port pair based on the second information includes:
when it is determined that the first condition is satisfied, determining that the information about the bridge delay of the first port pair includes a sum of a first processing time and a second processing time;
where
the first processing time is a processing time between the first port and the first terminal;
the second processing time is a processing time between the second port and a second terminal; and
the first port is a port of a first DS-TT; and the second port is a port of a second DS-TT.

In an implementation, when it is determined that the first condition is satisfied, it is determined that the bridge delay of the first port pair is a sum of a first processing time and a second processing time. That is, the determining that the information about the bridge delay of the first port pair includes a sum of a first processing time and a second processing time may be: determining that the information about the bridge delay of the first port pair is the sum of the first processing time and the second processing time.

In another implementation, when it is determined that the first condition is satisfied, it is determined that the bridge delay of the first port pair is a sum of a first processing time, a second processing time, and an internal forwarding and/or processing delay of the third communications device. That is, the determining that the information about the bridge delay of the first port pair includes a sum of a first processing time and a second processing time may be: determining that the information about the bridge delay includes the sum of the first processing time and the second processing time, and may further include other time overheads.

In an implementation, a processing time between the first port and the first terminal may be referred to as a first-UE-DS-TT residence time. The processing time between the first port and the first terminal may be a time required for a data packet to pass through the first port and the first terminal. The processing time between the second port and the second terminal may be referred to as a second-UE-DS-TT residence time. The processing time between the second port and the second terminal may be a time required for a data packet to pass through the second port and the second terminal.

Optionally, the first condition includes at least one of the following:
  the first port is a port of the first DS-TT;
  the second port is a port of the second DS-TT;
  the first DS-TT and the second DS-TT are different DS-TTs; and
  the first DS-TT is connected to the first terminal, the second DS-TT is connected to the second terminal, and the first terminal and the second terminal are a same terminal.

In an implementation, when the first port pair is a port of the first DS-TT and a port of the second DS-TT, the first DS-TT and the second DS-TT are different DS-TTs, and the first DS-TT and the second DS-TT are connected to the same terminal, it is determined that the information about the bridge delay of the first port pair includes the sum of the first processing time and the second processing time.

Optionally, the determining information about a bridge delay of the first port pair based on the second information includes:
  when it is determined that the second condition is satisfied, determining that the information about the bridge delay of the first port pair includes a sum of a first processing time, a packet delay budget (PDB) of a first terminal, a second processing time, and a PDB of a second terminal; or
  when it is determined that the second condition is satisfied, determining that the information about the bridge delay of the first port pair includes a sum of a bridge delay of a port pair of the first port and a third port, and a bridge delay of a port pair of the second port and the third port;
  where
  the first port is a port of a first DS-TT; the second port is a port of a second DS-TT; and the third port is a port of an NW-TT;
  the first processing time is a processing time between the first port and the first terminal; and
  the second processing time is a processing time between the second port and the second terminal.

In an implementation, when it is determined that the second condition is satisfied, it is determined that the information about the bridge delay of the first port pair includes a sum of the first processing time, a PDB of the first terminal, the second processing time, and a PDB of the second terminal; or a sum of a bridge delay of a port pair of the first port and the third port and a bridge delay of a port pair of the second port and the third port.

In another implementation, when it is determined that the second condition is satisfied, it is determined that the information about the bridge delay of the first port pair includes a sum of the first processing time, a PDB of the first terminal, the second processing time, and a PDB of the second terminal; or an internal forwarding and/or processing delay of the third communications device, and a sum of a bridge delay of a port pair of the first port and the third port and a bridge delay of a port pair of the second port and the third port.

To be specific, the determining that the information about the bridge delay of the first port pair includes the sum of the first processing time, the PDB of the first terminal, the second processing time, and the PDB of the second terminal may be: determining that the information about the bridge delay of the first port pair is the sum of the first processing time, the PDB of the first terminal, the second processing time, and the PDB of the second terminal, or may be: determining that the information about the bridge delay includes the sum of the first processing time, the PDB of the first terminal, the second processing time, and the PDB of the second terminal, and may further include other time overheads.

To be specific, the determining that the information about the bridge delay of the first port pair includes the sum of the bridge delay of the port pair of the first port and the third port and the bridge delay of the port pair of the second port and the third port may be: determining that the information about the bridge delay of the first port pair is the sum of the bridge delay of the port pair of the first port and the third port and the bridge delay of the port pair of the second port and the third port; or may be: determining that the information about the bridge delay includes the sum of the bridge delay of the port pair of the first port and the third port and the bridge delay of the port pair of the second port and the third port, and may further include other time overheads.

In an implementation, the bridge delay of the port pair of the first port and the third port may be a delay for a data packet to pass through the port pair of the first port and the third port, or a delay for a data packet to pass from the first port to the third port. The bridge delay of the port pair of the second port and the third port may be a delay for a data packet to pass through the port pair of the second port and the third port, or a delay for a data packet to pass from the second port to the third port.

Optionally, the second condition includes at least one of the following:
  the first port is a port of the first DS-TT;
  the second port is a port of the second DS-TT;
  the first DS-TT and the second DS-TT are different DS-TTs; and
  the first DS-TT is connected to the first terminal, the second DS-TT is connected to the second terminal, and the first terminal and the second terminal are different terminals.

In an implementation, when the first port pair is a port of the first DS-TT and a port of the second DS-TT, the first DS-TT and the second DS-TT are different DS-TTs and connected to different terminals, it is determined that the information about the bridge delay of the first port pair includes the sum of the bridge delay of the port pair of the first port and the third port and the bridge delay of the port pair of the second port and the third port.

Optionally, the performing a first operation based on the second information includes:
  performing the first operation based on second information of a TT in which the first port is located and second information of a TT in which the second port is located.

In an implementation, the second information of the first port may include TT-related information of a TT in which the first port is located; and the second information of the second port may include TT-related information of a TT in which the second port is located.

(1) In an implementation, when the third communications device is a terminal, the second information may be sent to the DS-TT.

(2) In an implementation, when the third communications device is an SMF, the second information may be received from one of the following: the terminal, the UPF, the NW-TT, and the DS-TT.

(3) In an implementation, when the third communications device is a PCF, the second information may be received from the SMF.

(4) In an implementation, when the third communications device is an NEF, the second information may be received from the PCF.

(5) In an implementation, when the third communications device is an AF, the second information may be received from one of the following: the terminal, the PCF, and the NEF.

In this embodiment of the present invention, the first operation is performed based on the second information, so as to support management and control of information related to the time-sensitive bridge, and further to support time-sensitive communication performed through the bridge by devices connected to the bridge.

The following describes the information transmission method in the embodiments of the present invention with reference to specific application scenarios.

Figure 9:
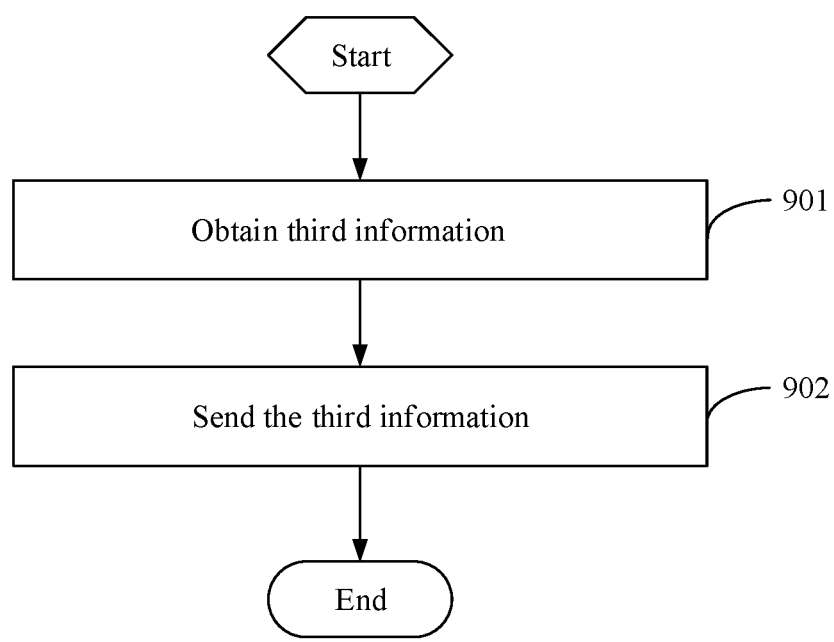
FIG. 9 is a flowchart of another information transmission method according to an embodiment of the present invention.

Referring to FIG. 9, an embodiment of the present invention further provides an information transmission method, applied to a fourth communications device. The fourth communications device includes, but is not limited to, a DS-TT, an NW-TT, a CN network element (such as one of the following: an SMF, a UPF, a PCF, an NEF, and an AF), and a RAN network element. The method includes the following steps.

Step 901: Obtain third information.
Step 902: Send the third information.
the third information includes information related to a third port;
the third port is a port of an NW-TT or a DS-TT; and
the sending the third information includes one of the following:
selecting a port-associated tunnel and sending the third information by using signaling related to the selected port-associated tunnel; and
selecting a port-unassociated or preconfigured communications device, and sending the third information to the selected communications device; where
the port-associated tunnel includes one of the following: a tunnel associated with the third port, and a fifth tunnel; and The fifth tunnel includes one of the following: a tunnel associated with any port within a bridge (for example, a bridge in which the third port is located), a tunnel associated with any port on a DS-TT side (such as one of the following: a DS-TT in which the third port is located, and any DS-TT in the bridge in which the third port is located), and a tunnel associated with any port on an NW-TT side (such as one of the following: an NW-TT in which the third port is located, and any NW-TT in the bridge in which the third port is located).

In an implementation, the bridge may be a bridge to which the third port belongs, and any port in the bridge may be any port other than the third port in the bridge.

In an implementation, any port on the DS-TT side may be any port other than the third port on the DS-TT side. In an implementation, any port on the NW-TT side may be any port other than the third port on the NW-TT side.

In an implementation, the port-associated tunnel may be a selected tunnel associated with the third port.

In an implementation, the port-unassociated communications device may be one of the following:
a communications device unassociated with any port;
a communications device unassociated with any port of a bridge in which the third port is located; and
a communications device unassociated with the third port.

In an implementation, the preconfigured communications device may be a preset communications device or a communications device prescribed in a protocol.

Optionally, the selecting a port-associated tunnel and sending the third information by using signaling related to the selected port-associated tunnel includes one of the following:
if a first condition is satisfied, waiting until the tunnel associated with the third port is established, and sending the third information by using signaling related to the tunnel associated with the third port; or
if a first condition is satisfied, sending the third information in an establishment process of the tunnel associated with the third port by using signaling related to the tunnel associated with the third port; or
if a second condition is satisfied, sending the third information by using setup request signaling of the tunnel associated with the third port; or
if a third condition is satisfied, selecting any one of tunnels associated with the third port and sending the third information by using signaling related to the selected tunnel; where
the first condition includes at least one of the following: the tunnel associated with the third port does not exist;
the second condition includes at least one of the following: the tunnel associated with the third port does not exist; and a TT in which the third port is located is a DS-TT; and
the third condition includes at least one of the following: there are a plurality of tunnels associated with the third port; and the TT in which the third port is located is an NW-TT.

In an implementation, if the third port is a port of the DS-TT side, the third information may be sent by using signaling related to a tunnel that is associated with any port of the DS-TT side. If the third port is a port of the NW-TT side, the third information may be sent by using signaling related to a tunnel that is associated with any port of the NW-TT side.

Optionally, the selecting a port-associated tunnel and sending the third information by using signaling related to the port-associated tunnel includes:
if a fourth condition is satisfied, selecting the fifth tunnel, and sending the third information by using signaling related to the fifth tunnel; where
the fourth condition includes at least one of the following:
the tunnel associated with the third port does not exist; and
a TT in which the third port is located is an NW-TT, or a TT in which the third port is located is a DS-TT.

Optionally, the selecting a port-unassociated or preconfigured communications device, and sending the third information to the selected communications device includes:
if a fifth condition is satisfied, selecting a port-unassociated or preconfigured communications device, and sending the third information to the selected communications device; where
the fifth condition includes at least one of the following: the tunnel associated with the third port does not exist;

the TT in which the third port is located is an NW-TT; and the fifth tunnel does not exist.

In an implementation, if there is no tunnel associated with the third port, a communications device unassociated with any port, a communications device unassociated with any port of a bridge in which the third port is located, a communications device unassociated with the third port, or a preconfigured communications device may be selected, and the third information may be sent to the selected communications device.

In this embodiment of the present invention, sending the third information can implement transmission of more bridge-related information, so as to support management and control of information related to the time-sensitive bridge, and further to support time-sensitive communication performed through the bridge by devices connected to the bridge.

Embodiment 1

Figure 10:
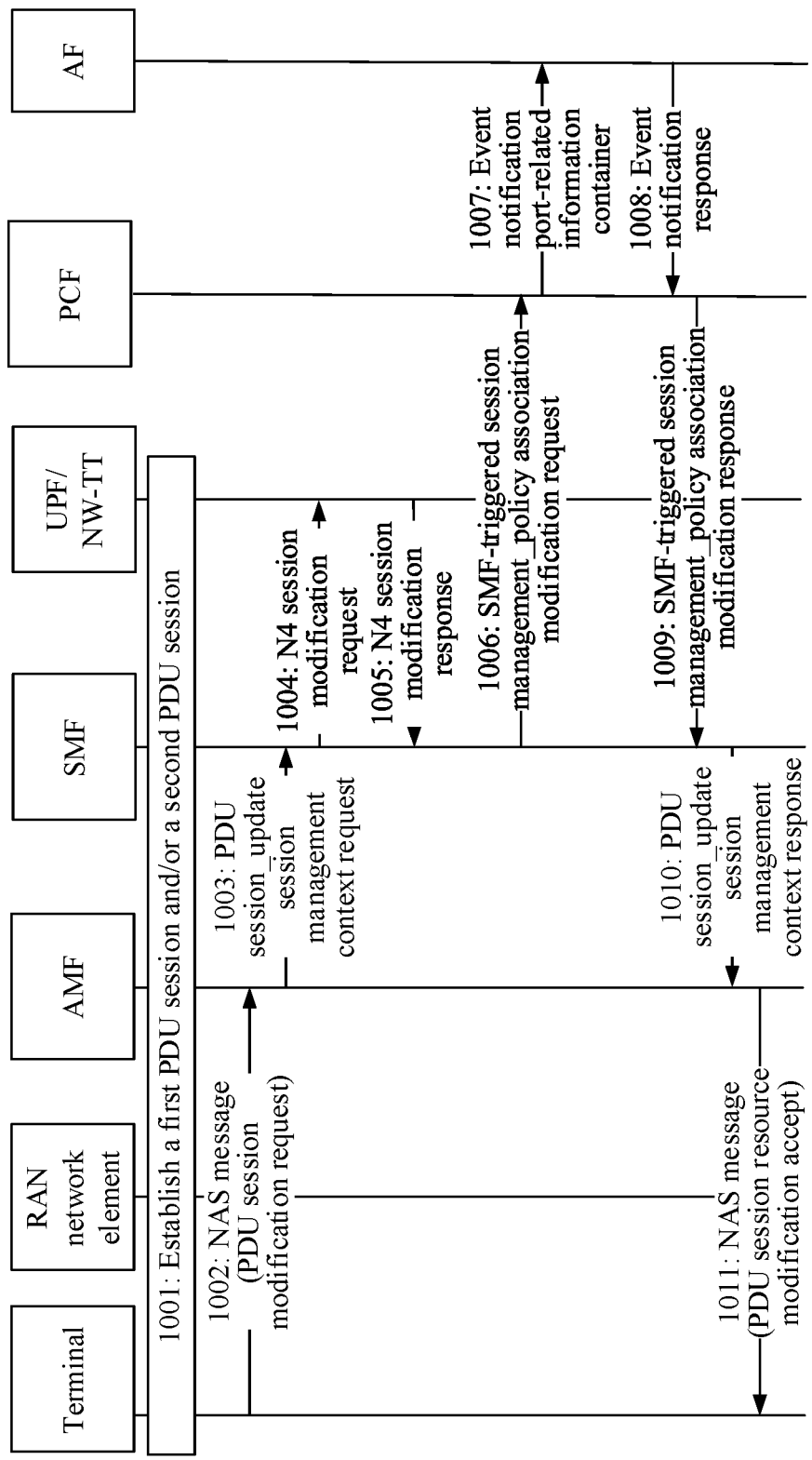
FIG. 10 is a schematic diagram of another application scenario according to an embodiment of the present invention.

This embodiment may be applied to the scenarios shown in FIG. 3 and FIG. 4, and as shown in FIG. 10, may include the following content.

Step 1001: Establish a first PDU session and/or a second PDU session. The first PDU session is a PDU session associated with a port 1 between UE and a UPF, and is also a PDU session associated with a port 3. The first PDU session is a PDU session associated with a port 2 between the UE and the UPF 1, and is also a PDU session associated with a port 4.

The port 1 is a port on a first DS-TT, the port 2 is a port on a second DS-TT, and the port 3 and the port 4 are ports on an NW-TT. The first DS-TT and the second DS-TT may be the same DS-TT or different DS-TTs.

Step 1002: The UE obtains a bridge delay of a first port pair. The first port pair includes the port 1 and the port 2. The bridge delay of the first port pair is per traffic class. That is, each traffic class supported by the port pair has the bridge delay of the first port pair, and the bridge delay of the first port pair for each traffic class may be different. The port 1 is a port on the first DS-TT; and the port 2 is a port on the second DS-TT.

In an implementation, the DS-TT sends the bridge delay of the first port pair to the UE; in other words, the UE obtains the bridge delay of the first port pair from the DS-TT. For example, when the port 1 and the port 2 of the first port pair are ports on the same DS-TT, the UE obtains the bridge delay of the first port pair from the DS-TT. For example, when the port 1 and the port 2 of the first port pair are ports on different DS-TTs, the first DS-TT or the second DS-TT may obtain the bridge delay of the first port pair through measurement and/or calculation. In this case, the UE may alternatively obtain the bridge delay of the first port pair from the first DS-TT or the second DS-TT.

In another implementation, the UE measures and/or calculates the bridge delay of the first port pair. For example, when the port 1 and the port 2 of the first port pair are ports on different DS-TTs, the UE obtains the bridge delay of the first port pair through measurement and/or calculation.

The UE selects the first PDU session or the second PDU session, and sends bridge-related information of the first port pair to a network by using signaling (for example, a PDU session modification request) related to the first PDU session or signaling (for example, a PDU session modification request) related to the second PDU session (as described in the embodiment of FIG. 2).

In an implementation, the bridge delay of the first port pair is sent to the AF by being included in a port control information container. The port control information container is included in the signaling related to the first PDU session or the signaling related to the second PDU session.

In an implementation, the bridge delay of the first port pair is sent to an SMF, without being included in the port control information container. The SMF then sends the bridge delay of the first port pair to the AF.

Step 1003: An AMF sends a PDU session update session management context request to the SMF, where the PDU session update session management context request includes a PDU session modification request.

Step 1004: Optionally, the SMF sends an N4 session modification request to the UPF.

Step 1005: Optionally, the UPF sends an N4 session modification response to the SMF. In an implementation, the UPF may add bridge-related information of a second port pair on the NW-TT side to the N4 session modification response (as described in the embodiment of FIG. 2).

The second port pair includes the port 3 and the port 4. The bridge delay of the second port pair is per traffic class. That is, each traffic class supported by the port pair has the bridge delay of the second port pair, and the bridge delay of the second port pair for each traffic class may be different. The port 3 and the port 4 are ports on the NW-TT.

In an implementation, a bridge delay of the second port pair is sent to the AF by being included in a port control information container. The port control information container is included in the signaling related to the first PDU session or the signaling related to the second PDU session.

In an implementation, the bridge delay of the second port pair is sent the SMF, without being included in the port control information container. The SMF then sends the bridge delay of the second port pair to the AF.

Step 1006: The SMF transmits an SMF-triggered session management_policy association modification request to the PCF. The SMF-triggered session management_policy association modification request includes the bridge-related information of the first port pair and the bridge-related information of the first port pair.

Step 1007: The PCF sends an event notification to the AF, where the event notification includes the bridge-related information of the first port pair and/or the bridge-related information of the second port pair.

After receiving the bridge-related information of the first port pair and/or the bridge-related information of the second port pair, the AF sends the bridge-related information of the first port pair and/or the bridge-related information of the second port pair to a time-sensitive network control node (such as a CNC).

The CNC determines scheduling control of time-sensitive data and configuration information of bridge ports based on the bridge-related information of the first port pair and/or the bridge-related information of the second port pair.

Step 1008: The AF sends an event notification response to the PCF. Optionally, the event notification response includes the configuration information of the bridge ports.

Step 1009: The PCF sends an SMF-triggered session management_policy association modification response to the SMF.

Step 1010: The SMF sends a PDU session update session management context response to the AMF. Optionally, the PDU session update session management context response includes the configuration information of the bridge ports.

Step 1011: The AMF sends a NAS message to the UE, where the NAS message includes the PDU session modification.

Embodiment 2

This embodiment may be applied to the scenarios shown in FIG. 4 and FIG. 5, and may include the following content.

Step 1: UE requests to establish a first PDU session for a port 1 or a second PDU session for a port 2. The PDU session setup request indicates TT-related information of a DS-TT in which the port 1 is located, and the TT-related information includes at least one of the following: an index of a TT (for example, an index of a DS-TT) and an identifier of the TT (for example, an identifier of the DS-TT). The index of the DS-TT may be used to distinguish different DS-TTs, for example, a port associated with a TT index 1 of a DS-TT in which the port is located and a port associated with a TT index 2 of a DS-TT in which the port is located belong to different DS-TTs.

Step 2: An SMF sends port-related information to a PCF, to indicate TT-related information of a TT associated with a port, a PDB (PDB per UE per traffic class) per UE per traffic class, and a UE-DS-TT residence time per port per traffic class (UE-DS-TT residence time per port per traffic class). The UE-DS-TT residence time may be a processing time between a port and a terminal.

Step 3: A PCF sends a bridge delay of a port pair to an AF, to indicate TT-related information of a TT associated with a port, a PDB (PDB per UE per traffic class) per UE per traffic class, and a UE-DS-TT residence time per port per traffic class (UE-DS-TT residence time per port per traffic class). The UE-DS-TT residence time may be a processing time between a port 1 and a terminal.

The AF may determine one of the following based on port-associated UE and information related to a TT in which a port is located:
whether two ports of the port pair belong to the same DS-TT;
whether DS-TTs in which two ports of the port pair are located are associated with the same UE; and
whether two ports of the port pair belong to the same NW-TT.

When a first condition is satisfied, a bridge delay of a first port pair is generated. In an implementation, the bridge delay of the port pair may be first-UE-DS-TT residence time+second-UE-DS-TT residence time.

A first port and a second port of the port pair belong to different DS-TTs.

The DS-TT of the first port and the DS-TT of the second port are connected to the same UE.

When a second condition is satisfied, the bridge delay of the first port pair is generated, In an implementation, the bridge delay of the port pair may be first-UE-DS-TT residence time+PDB of the first UE+second-UE-DS-TT residence time+PDB of the second UE. In another implementation, the bridge delay of the port pair may be a bridge delay of a port pair of a port 1 and a port 3+a bridge delay of a port pair of the port 2 and the port 3.

The first port and the second port of the port pair belong to different DS-TTs.

The DS-TT of the first port and the DS-TT of the second port are connected to different UEs.

Embodiment 3

Figure 11:
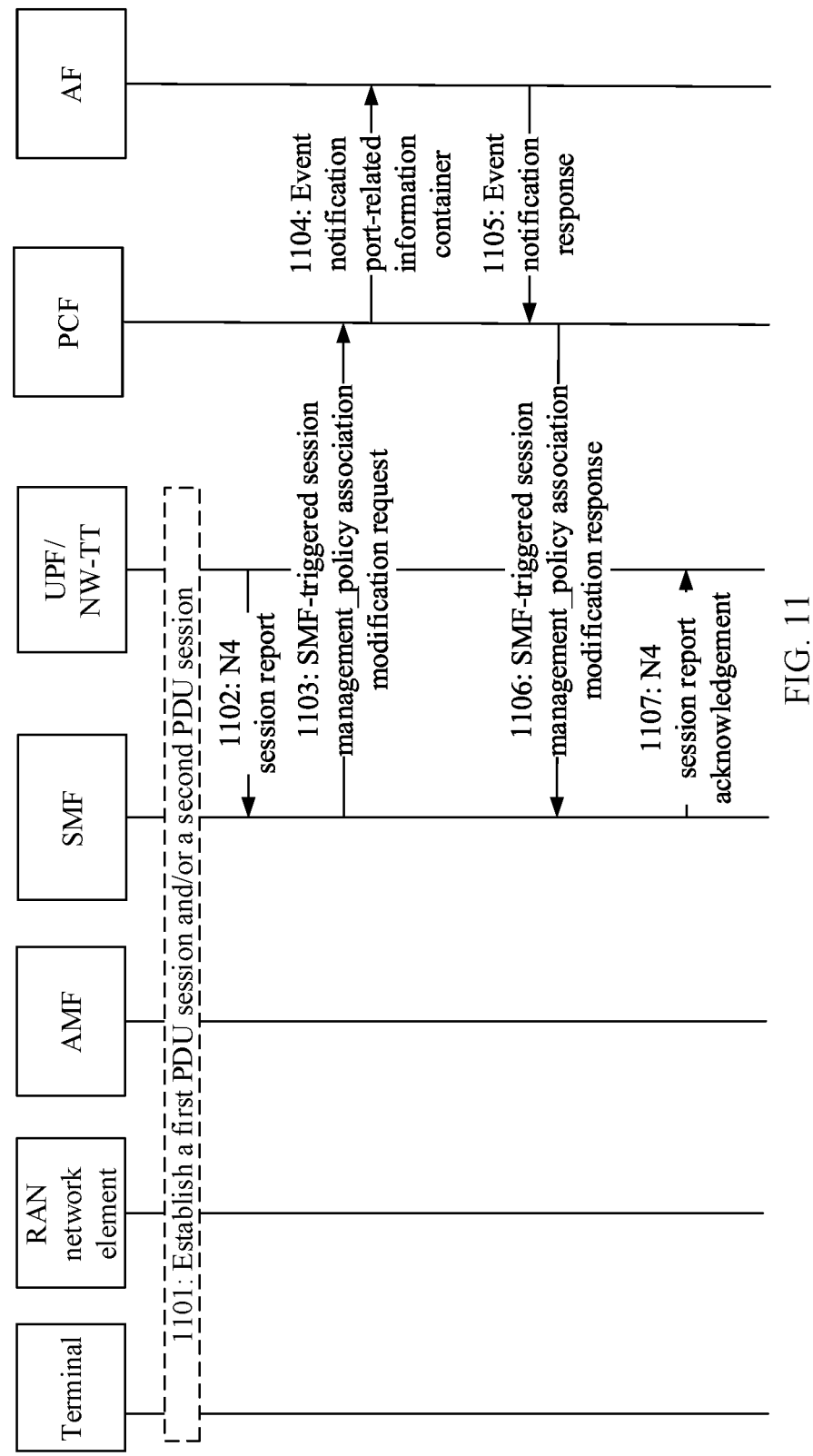
FIG. 11 is a schematic diagram of another application scenario according to an embodiment of the present invention.

This embodiment may be applied to the scenario shown in FIG. 6, and as shown in FIG. 11, may include the following content.

Step 1101: Optionally, establish a first PDU session and/or a second PDU session. The first PDU session is a PDU session associated with a port 1 between UE and a UPF, and is also a PDU session associated with a port 3. The first PDU session is a PDU session associated with a port 2 between the UE and the UPF 1, and is also a PDU session associated with a port 4.

The port 1 is a port on a first DS-TT, the port 2 is a port on a second DS-TT, and the port 3 and the port 4 are ports on an NW-TT. The first DS-TT and the second DS-TT may be the same DS-TT or different DS-TTs.

Step 1102: The UPF obtains a bridge delay of a first port pair. Two ports of the first port pair are ports on the NW-TT (the port 3 and the port 4). The bridge delay is per traffic class.

The UPF selects one SMF to send the bridge delay of the first port pair. When the first PDU session and/or the second PDU session exists, an SMF for the first PDU session and/or the second PDU session is selected; otherwise, a preconfigured SMF is selected. The UPF may send the bridge delay of the first port pair by using an N4 report message.

The UPF sends an N4 report request to the selected SMF, where the N4 report request includes bridge-related information of the first port pair.

Step 1103: If the SMF is a preconfigured SMF, the SMF selects a preconfigured PCF.

The SMF sends an SMF-triggered session management_policy association modification request to the PCF. The SMF-triggered session management_policy association modification request includes the bridge-related information of the first port pair.

Step 1104: The PCF sends an event notification to the AF, where the event notification includes the bridge-related information of the first port pair.

After receiving the bridge-related information of the first port pair, the AF sends the bridge-related information of the first port pair to a time-sensitive network control node (for example, a CNC).

Based on the bridge-related information of the first port pair, the CNC determines scheduling control of time-sensitive data and configuration information of bridge ports.

Step 1105: The AF sends an event notification response to the PCF. Optionally, the event notification response includes the configuration information of the bridge ports.

Step 1106: The PCF sends an SMF-triggered session management_policy association modification response to the SMF. Optionally, the session management_policy association modification response includes the configuration information of the bridge ports.

Step 1107: The SMF sends an N4 session report acknowledgement to the UPF. Optionally, the N4 session report acknowledgement includes the configuration information of the bridge ports.

Step 4: The PCF sends the bridge delay of the first port pair to the AF.

Step 5: The AF reports the bridge delay of the first port pair to the CNC.

In this embodiment of the present invention, when the bridge delay of the port pair needs to be reported to the CNC in the 5G bridge:
in a case that two ports of the port pair are ports of the same DS-TT, the UE reports the bridge delay of the port pair to the network;
in a case that two ports of the port pair are ports of different DS-TTs and the two DS-TTs are connected to the same UE, the UE reports the bridge delay of the port pair to the network, or the UE assists the network in calculating the bridge delay of the port pair; for example, informing information related to the DS-TT of the port during setup of the PDU session for the port;

in a case that two ports of the port pair are ports of different DS-TTs and the two DS-TTs are connected to different UEs, the network needs to specially calculate the bridge delay of the port pair to the network; and in a case that two ports of the port pair are ports of different NW-TTs, if a PDU session for the port of the DS-TT has not been established, a preconfigured SMF and a preconfigured PCF need to send the bridge delay of the port pair to the AF.

In this embodiment of the present invention, the bridge delay of the port pair can be reported in the 5G bridge, a transfer mechanism of a time-sensitive service can be configured by the CNC based on the bridge delay of the port pair, and the TSN can be implemented.

Figure 12:
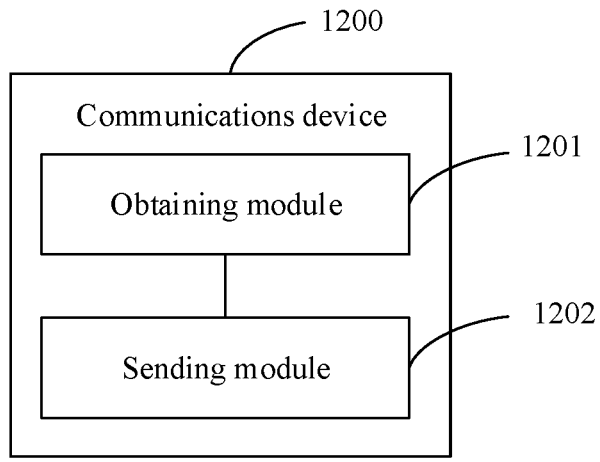
FIG. 12 is a structural diagram of a communications device according to the present invention.

Referring to FIG. 12, an embodiment of the present invention provides a communications device. The communications device is a first communications device. The first communications device includes, but is not limited to, a terminal, a TT (such as one of the following: a DS-TT, an NW-TT, a first DS-TT, a second DS-TT, a first NW-TT, and a second NW-TT), a CN network element (such as one of the following: an SMF, a UPF, a PCF, an NEF, and an AF), and a RAN network element. As shown in FIG. 12, the communications device 1200 includes:

an obtaining module 1201, configured to obtain first information; and a sending module 1202, configured to send the first information; where the first information includes bridge-related information of a first port pair;

the first port pair includes a first port and a second port;

the first port is a port of a first TT; and the second port is a port of a second TT; and the first TT is a first DS-TT, and the second TT is a second DS-TT; or the first TT is a first NW-TT, and the second TT is a second NW-TT.

Optionally, the sending the first information includes one of the following:

selecting a port-associated tunnel and sending the first information by using signaling related to the port-associated tunnel; and selecting a port-unassociated or preconfigured communications device, and sending the first information to the selected communications device; where the port-associated tunnel includes one of the following: a first tunnel, a second tunnel, a third tunnel, and a tunnel related to a DS-TT side port;

the first tunnel is a tunnel associated with the first port;

the second tunnel is a tunnel associated with the second port; and the third tunnel includes one of the following: a tunnel associated with any port within a bridge, a tunnel associated with any port on a DS-TT side, and a tunnel associated with any port on an NW-TT side.

In an implementation, the bridge may be a bridge to which the first port and/or the second port belongs. Any port in the bridge may be any port of the bridge, or any port other than the first port and/or the second port in the bridge.

In an implementation, any port on the DS-TT side may be any port other than the first port and/or the second port on the DS-TT side. In an implementation, any port on the NW-TT side may be any port other than the first port and/or the second port on the NW-TT side.

Optionally, the selecting a port-associated tunnel and sending the first information by using signaling related to the port-associated tunnel includes one of the following:

if a first condition is satisfied, waiting until the first tunnel and/or the second tunnel is established, and sending the first information by using signaling related to the first tunnel or signaling related to the second tunnel;

if a first condition is satisfied, sending the first information in an establishment process of the first tunnel and/or the second tunnel by using signaling related to the first tunnel or signaling related to the second tunnel;

if a second condition is satisfied, sending the first information by using setup request signaling of the first tunnel or setup request signaling of the second tunnel; or if a third condition is satisfied, selecting any one of the first tunnels or any one of the second tunnels and sending the first information; where the first condition includes at least one of the following: the first tunnel and the second tunnel do not exist;

the second condition includes at least one of the following: the first tunnel and the second tunnel do not exist, and the first TT and the second TT are both DS-TTs; and the third condition includes at least one of the following: there are a plurality of first tunnels and/or second tunnels, and the first TT and the second TT are both NW-TTs.

Optionally, the selecting a port-associated tunnel and sending the first information by using signaling related to the port-associated tunnel includes:

if a fourth condition is satisfied, selecting the third tunnel, and sending the first information by using signaling related to the third tunnel; where the fourth condition includes at least one of the following: the first tunnel and the second tunnel do not exist; and the first TT and the second TT are both NW-TTs, or the first TT and the second TT are both DS-TTs.

Optionally, the selecting a port-unassociated or preconfigured communications device, and sending the first information to the selected communications device includes:

if a fifth condition is satisfied, selecting a port-unassociated or preconfigured communications device, and sending the first information to the selected communications device; where the fifth condition includes at least one of the following: the first tunnel and the second tunnel do not exist; the first TT and the second TT are both NW-TTs; and the third tunnel does not exist.

Optionally, in a case that the first information is sent by using signaling related to a port-associated tunnel:

the first information is sent by being included in a port control information container of the signaling related to the port-associated tunnel;

or the first information is included in the signaling related to the port-associated tunnel, and is sent outside a port control information container.

Optionally, the obtaining first information includes:

receiving the first information from another device;

or obtaining, by the first communications device, the first information through measurement and/or calculation.

Optionally, the first DS-TT and the second DS-TT are a same DS-TT; or the first DS-TT and the second DS-TT are different DS-TTs.

Optionally, the first NW-TT and the second NW-TT are a same NW-TT; or the first NW-TT and the second NW-TT are different NW-TTs.

Optionally, the bridge-related information of the first port pair includes at least one of the following:

a bridge delay of the first port pair, port-related information of the first port, port-related information of the second port, and a traffic class associated with the bridge delay of the first port pair.

Optionally, the port-related information includes at least one of the following: identification information of a port, and TT-related information of a TT in which the port is located.

Optionally, the TT-related information includes at least one of the following: identification information of a TT, and index information of the TT.

The communications device 1200 is capable of implementing the processes implemented by the first communications device in the method embodiments of the present invention, with the same beneficial effects achieved. To avoid repetition, details are not described herein again.

Figure 13:
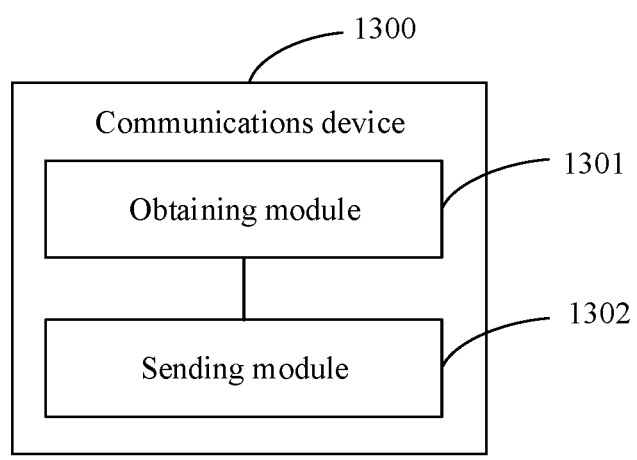
FIG. 13 is a structural diagram of another communications device according to the present invention.

Referring to FIG. 13, an embodiment of the present invention provides another communications device. The communications device is a second communications device. The second communications device includes, but is not limited to, a terminal, a DS-TT, an NW-TT, a CN network element (such as one of the following: an SMF, a UPF, a PCF, an NEF, and an AF), and a RAN network element. As shown in FIG. 13, the communications device 1300 includes:

an obtaining module 1301, configured to obtain second information; and a sending module 1302, configured to send the second information; where the second information includes TT-related information.

Optionally, the TT-related information is TT-related information of a TT in which the N-th port is located. The TT is a DS-TT or an NW-TT.

Optionally, the TT-related information includes at least one of the following: index information of a TT, and identification information of the TT.

Optionally, the sending the second information includes one of the following:

selecting a port-associated tunnel and sending the second information by using signaling related to the port-associated tunnel; and selecting a port-unassociated or preconfigured communications device, and sending the second information to the selected communications device; where the port-associated tunnel includes one of the following: a tunnel associated with the N-th port, and a fourth tunnel; and the fourth tunnel includes one of the following: a tunnel associated with any port within a bridge, a tunnel associated with any port on a DS-TT side, and a tunnel associated with any port on an NW-TT side.

In an implementation, the bridge may be a bridge to which the N-th port belongs. Any port in the bridge may be any port other than the N-th port in the bridge.

In an implementation, any port on the DS-TT side may be any port other than the N-th port on the DS-TT side. In an implementation, any port on the NW-TT side may be any port other than the N-th port on the NW-TT side.

Optionally, the selecting a port-associated tunnel and sending the second information by using signaling related to the port-associated tunnel includes:

if a first condition is satisfied, waiting until the tunnel associated with the N-th port is established, and sending the second information by using signaling related to the tunnel associated with the N-th port; or if a first condition is satisfied, sending the second information in an establishment process of the tunnel associated with the N-th port by using signaling related to the tunnel associated with the N-th port; or if a second condition is satisfied, sending the second information by using setup request signaling of the tunnel associated with the N-th port; or if a third condition is satisfied, selecting any one of tunnels associated with the N-th port and sending the second information by using signaling related to the selected tunnel; where the first condition includes at least one of the following: the tunnel associated with the N-th port does not exist;

the second condition includes at least one of the following: the tunnel associated with the N-th port does not exist; and the TT in which the N-th port is located is a DS-TT; and the third condition includes at least one of the following: there are a plurality of tunnels associated with the N-th port; and the TT in which the N-th port is located is an NW-TT.

Optionally, the selecting a port-associated tunnel and sending the second information by using signaling related to the port-associated tunnel includes:

if a fourth condition is satisfied, selecting the fourth tunnel, and sending the second information by using signaling related to the fourth tunnel; where the fourth condition includes at least one of the following: the tunnel associated with the N-th port does not exist; and the TT in which the N-th port is located is an NW-TT, or the TT in which the N-th port is located is a DS-TT.

Optionally, the selecting a port-unassociated or preconfigured communications device, and sending the second information to the selected communications device includes:

if a fifth condition is satisfied, selecting a port-unassociated or preconfigured communications device, and sending the second information to the selected communications device; where the fifth condition includes at least one of the following: the tunnel associated with the N-th port does not exist; the TT in which the N-th port is located is an NW-TT; and the fourth tunnel does not exist.

Optionally, in a case that the second information is sent by using signaling related to a port-associated tunnel:

the second information is sent by being included in a port control information container of the signaling related to the port-associated tunnel;

or the second information is included in the signaling related to the port-associated tunnel, and is sent outside a port control information container.

The communications device 1300 is capable of implementing the processes implemented by the second communications device in the method embodiments of the present invention, with the same beneficial effects achieved. To avoid repetition, details are not described herein again.

Figure 14:
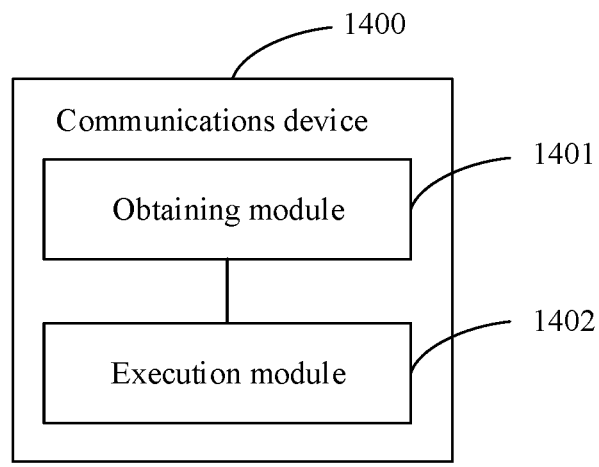
FIG. 14 is a structural diagram of another communications device according to the present invention.

Referring to FIG. 14, an embodiment of the present invention provides another communications device. The communications device is a third communications device. The third communications device includes, but is not limited to, a terminal, a DS-TT, an NW-TT, a CN network element (such as one of the following: an SMF, a UPF, a PCF, an NEF, and an AF), and a RAN network element. As shown in FIG. 14, the communications device 1400 includes:

an obtaining module 1401, configured to obtain second information; and an execution module 1402, configured to perform a first operation based on the second information, where the first operation includes at least one of the following:

determining a first port pair;

determining whether a first port and a second port of the first port pair are ports of a same TT;

determining whether the first port and the second port of the first port pair satisfy a first condition;

determining whether the first port and the second port of the first port pair satisfy a second condition; and determining information about a bridge delay of the first port pair; where the second information includes TT-related information; and the first port pair includes the first port and the second port.

In an implementation, the first port pair is a port pair of a bridge.

In an implementation, the determining a first port pair is intended to determine the bridge delay of the first port pair.

Optionally, the determining a first port pair includes:

determining that the first port pair excludes a port pair of two ports on the same TT.

In an implementation, the two ports on the same TT are, for example, two ports on the same NW-TT, or two ports on the same DS-TT. In an implementation, for the first port pair, it is determined based on the TT-related information of a TT in which the ports are located whether the two ports are on the same TT. It is easy to understand that devices behind the same TT may not need to access, through the TT (DS-TT), the bridge associated with the TT, for routing. Therefore, during forming of the port pair of the bridge or forming of the bridge delay of the port pair, the bridge delay of the port pair of the two ports on the same TT does not need to be considered.

Optionally, the determining information about a bridge delay of the first port pair based on the second information includes:

when it is determined that the first condition is satisfied, determining that the information about the bridge delay of the first port pair includes a sum of a first processing time and a second processing time;

where the first processing time is a processing time between the first port and the first terminal; and the second processing time is a processing time between the second port and a second terminal; and the first port is a port of a first DS-TT; and the second port is a port of a second DS-TT.

Optionally, the first condition includes at least one of the following:

the first port is a port of the first DS-TT;

the second port is a port of the second DS-TT;

the first DS-TT and the second DS-TT are different DS-TTs; and the first DS-TT is connected to the first terminal, the second DS-TT is connected to the second terminal, and the first terminal and the second terminal are a same terminal.

Optionally, the determining information about a bridge delay of the first port pair based on the second information includes:

when it is determined that the second condition is satisfied, determining that the information about the bridge delay of the first port pair includes a sum of a first processing time, a packet delay budget PDB of a first terminal, a second processing time, and a PDB of a second terminal; or when it is determined that the second condition is satisfied, determining that the information about the bridge delay of the first port pair includes a sum of a bridge delay of a port pair of the first port and a third port, and a bridge delay of a port pair of the second port and the third port;

where the first port is a port of a first DS-TT; the second port is a port of a second DS-TT; and the third port is a port of an NW-TT;

the first processing time is a processing time between the first port and the first terminal; and the second processing time is a processing time between the second port and the second terminal.

Optionally, the second condition includes at least one of the following:

the first port is a port of the first DS-TT;

the second port is a port of the second DS-TT;

the first DS-TT and the second DS-TT are different DS-TTs; and the first DS-TT is connected to the first terminal, the second DS-TT is connected to the second terminal, and the first terminal and the second terminal are different terminals.

Optionally, the performing a first operation based on the second information includes:

performing the first operation based on second information of a TT in which the first port is located and second information of a TT in which the second port is located.

The communications device 1400 is capable of implementing the processes implemented by the third communications device in the method embodiments of the present invention, with the same beneficial effects achieved. To avoid repetition, details are not described herein again.

Figure 15:
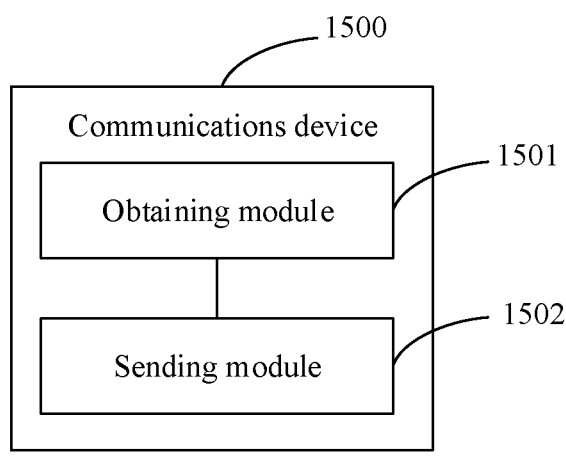
FIG. 15 is a structural diagram of another communications device according to the present invention.

Referring to FIG. 15, an embodiment of the present invention provides another communications device. The communications device is a fourth communications device. The fourth communications device includes, but is not limited to, a terminal, a DS-TT, an NW-TT, a CN network element (such as one of the following: an SMF, a UPF, a PCF, an NEF, and an AF), and a RAN network element. As shown in FIG. 15, the communications device 1500 includes:

an obtaining module 1501, configured to obtain third information; and a sending module 1502, configured to send the third information; where the third information includes information related to a third port;

the third port is a port of an NW-TT or a DS-TT; and the sending the third information includes one of the following:

selecting a port-associated tunnel and sending the third information by using signaling related to the selected port-associated tunnel; and selecting a port-unassociated or preconfigured communications device, and sending the third information to the selected communications device; where the port-associated tunnel includes one of the following: a tunnel associated with the third port, and a fifth tunnel; and the fifth tunnel includes one of the following: a tunnel associated with any port within a bridge, a tunnel associated with any port on a DS-TT side, and a tunnel associated with any port on an NW-TT side.

In an implementation, the bridge may be a bridge to which the third port belongs, and any port in the bridge may be any port other than the third port in the bridge.

In an implementation, any port on the DS-TT side may be any port other than the third port on the DS-TT side. In an implementation, any port on the NW-TT side may be any port other than the third port on the NW-TT side.

Optionally, the selecting a port-associated tunnel and sending the third information by using signaling related to the selected port-associated tunnel includes one of the following:
- if a first condition is satisfied, waiting until the tunnel associated with the third port is established, and sending the third information by using signaling related to the tunnel associated with the third port; or
- if a first condition is satisfied, sending the third information in an establishment process of the tunnel associated with the third port by using signaling related to the tunnel associated with the third port; or
- if a second condition is satisfied, sending the third information by using setup request signaling of the tunnel associated with the third port; or
- if a third condition is satisfied, selecting any one of tunnels associated with the third port and sending the third information by using signaling related to the selected tunnel; where
- the first condition includes at least one of the following: the tunnel associated with the third port does not exist;
- the second condition includes at least one of the following: the tunnel associated with the third port does not exist; and a TT in which the third port is located is a DS-TT; and
- the third condition includes at least one of the following: there are a plurality of tunnels associated with the third port; and the TT in which the third port is located is an NW-TT.

Optionally, the selecting a port-associated tunnel and sending the third information by using signaling related to the port-associated tunnel includes:
- if a fourth condition is satisfied, selecting the fifth tunnel, and sending the third information by using signaling related to the fifth tunnel; where
- the fourth condition includes at least one of the following: the tunnel associated with the third port does not exist; and
- a TT in which the third port is located is an NW-TT, or a TT in which the third port is located is a DS-TT.

Optionally, the selecting a port-unassociated or preconfigured communications device, and sending the third information to the selected communications device includes:
- if a fifth condition is satisfied, selecting a port-unassociated or preconfigured communications device, and sending the third information to the selected communications device; where
- the fifth condition includes at least one of the following: the tunnel associated with the third port does not exist; the TT in which the third port is located is an NW-TT; and the fifth tunnel does not exist.

The communications device 1500 is capable of implementing the processes implemented by the fourth communications device in the method embodiments of the present invention, with the same beneficial effects achieved. To avoid repetition, details are not described herein again.

Figure 16:
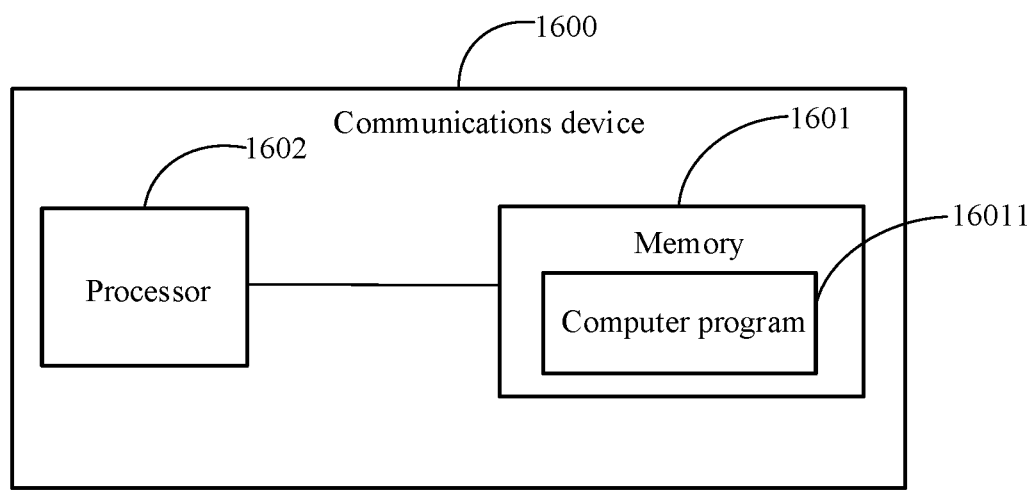
FIG. 16 is a structural diagram of another communications device according to the present invention.

Referring to FIG. 16, FIG. 16 is a structural diagram of another communications device according to an embodiment of the present invention. As shown in FIG. 16, the communications device 1600 includes a memory 1601, a processor 1602, and a computer program 16011 stored on the memory 1601 and capable of running on the processor 1602.

When the communications device 1600 acts as the first communications device in the foregoing method embodiment, the following steps are implemented when the computer program 16011 is executed by the processor 1602:
- obtaining first information; and
- sending the first information.

The first information includes bridge-related information of a first port pair;
- the first port pair includes a first port and a second port;
- the first port is a port of a first time-sensitive network translator TT, and the second port is a port of a second TT; and
- the first TT is a first device-side time-sensitive network translator DS-TT and the second TT is a second DS-TT; or the first TT is a first network-side time-sensitive network translator NW-TT and the second TT is a second NW-TT.

Optionally, the sending the first information includes one of the following:
- selecting a port-associated tunnel and sending the first information by using signaling related to the port-associated tunnel; and
- selecting a port-unassociated or preconfigured communications device, and sending the first information to the selected communications device; where
- the port-associated tunnel includes one of the following: a first tunnel, a second tunnel, a third tunnel, and a tunnel related to a DS-TT side port;
- the first tunnel is a tunnel associated with the first port;
- the second tunnel is a tunnel associated with the second port; and
- the third tunnel includes one of the following: a tunnel associated with any port within a bridge, a tunnel associated with any port on a DS-TT side, and a tunnel associated with any port on an NW-TT side.

Optionally, the selecting a port-associated tunnel and sending the first information by using signaling related to the port-associated tunnel includes one of the following:
- if a first condition is satisfied, waiting until the first tunnel and/or the second tunnel is established, and sending the first information by using signaling related to the first tunnel or signaling related to the second tunnel;
- if a first condition is satisfied, sending the first information in an establishment process of the first tunnel and/or the second tunnel by using signaling related to the first tunnel or signaling related to the second tunnel;
- if a second condition is satisfied, sending the first information by using setup request signaling of the first tunnel or setup request signaling of the second tunnel; or
- if a third condition is satisfied, selecting any one of the first tunnels or any one of the second tunnels and sending the first information; where
- the first condition includes at least one of the following: the first tunnel and the second tunnel do not exist;
- the second condition includes at least one of the following: the first tunnel and the second tunnel do not exist, and the first TT and the second TT are both DS-TTs; and the third condition includes at least one of the following:
there are a plurality of first tunnels and/or second tunnels, and the first TT and the second TT are both NW-TTs.

Optionally, the selecting a port-associated tunnel and sending the first information by using signaling related to the port-associated tunnel includes:
if a fourth condition is satisfied, selecting the third tunnel, and sending the first information by using signaling related to the third tunnel; where
the fourth condition includes at least one of the following:
the first tunnel and the second tunnel do not exist; and
the first TT and the second TT are both NW-TTs, or the first TT and the second TT are both DS-TTs.

Optionally, the selecting a port-unassociated or preconfigured communications device, and sending the first information to the selected communications device includes:
if a fifth condition is satisfied, selecting a port-unassociated or preconfigured communications device, and sending the first information to the selected communications device; where
the fifth condition includes at least one of the following:
the first tunnel and the second tunnel do not exist; the first TT and the second TT are both NW-TTs; and the third tunnel does not exist.

Optionally, in a case that the first information is sent by using signaling related to a port-associated tunnel:
the first information is sent by being included in a port control information container of the signaling related to the port-associated tunnel;
or
the first information is included in the signaling related to the port-associated tunnel, and is sent outside a port control information container.

Optionally, the obtaining first information includes:
receiving the first information from another device;
or
obtaining, by the first communications device, the first information through measurement and/or calculation.

Optionally, the first DS-TT and the second DS-TT are a same DS-TT; or the first DS-TT and the second DS-TT are different DS-TTs.

Optionally, the first NW-TT and the second NW-TT are a same NW-TT; or
the first NW-TT and the second NW-TT are different NW-TTs.

Optionally, the bridge-related information of the first port pair includes at least one of the following:
a bridge delay of the first port pair, port-related information of the first port, port-related information of the second port, and a traffic class associated with the bridge delay of the first port pair.

Optionally, the port-related information includes at least one of the following: identification information of a port, and TT-related information of a TT in which the port is located.

Optionally, the TT-related information includes at least one of the following: identification information of a TT, and index information of the TT.

When the communications device 1600 acts as the second communications device in the foregoing method embodiment, the following steps are implemented when the computer program 16011 is executed by the processor 1602:
obtaining second information; and
sending the second information; where
the second information includes TT-related information.

Optionally, the TT-related information is TT-related information of a TT in which the N-th port is located. The TT is a DS-TT or an NW-TT.

Optionally, the TT-related information includes at least one of the following: index information of a TT, and identification information of the TT.

Optionally, the sending the second information includes one of the following:
selecting a port-associated tunnel and sending the second information by using signaling related to the port-associated tunnel; and
selecting a port-unassociated or preconfigured communications device, and sending the second information to the selected communications device; where
the port-associated tunnel includes one of the following: a tunnel associated with the N-th port, and a fourth tunnel; and
the fourth tunnel includes one of the following: a tunnel associated with any port within a bridge, a tunnel associated with any port on a DS-TT side, and a tunnel associated with any port on an NW-TT side.

Optionally, the selecting a port-associated tunnel and sending the second information by using signaling related to the port-associated tunnel includes:
if a first condition is satisfied, waiting until the tunnel associated with the N-th port is established, and sending the second information by using signaling related to the tunnel associated with the N-th port; or
if a first condition is satisfied, sending the second information in an establishment process of the tunnel associated with the N-th port by using signaling related to the tunnel associated with the N-th port; or
if a second condition is satisfied, sending the second information by using setup request signaling of the tunnel associated with the N-th port; or
if a third condition is satisfied, selecting any one of tunnels associated with the N-th port and sending the second information by using signaling related to the selected tunnel; where
the first condition includes at least one of the following: the tunnel associated with the N-th port does not exist;
the second condition includes at least one of the following: the tunnel associated with the N-th port does not exist; and the TT in which the N-th port is located is a DS-TT; and
the third condition includes at least one of the following: there are a plurality of tunnels associated with the N-th port; and the TT in which the N-th port is located is an NW-TT.

Optionally, the selecting a port-associated tunnel and sending the second information by using signaling related to the port-associated tunnel includes:
if a fourth condition is satisfied, selecting the fourth tunnel, and sending the second information by using signaling related to the fourth tunnel; where
the fourth condition includes at least one of the following:
the tunnel associated with the N-th port does not exist; and
the TT in which the N-th port is located is an NW-TT, or the TT in which the N-th port is located is a DS-TT.

Optionally, the selecting a port-unassociated or preconfigured communications device, and sending the second information to the selected communications device includes:
if a fifth condition is satisfied, selecting a port-unassociated or preconfigured communications device, and sending the second information to the selected communications device; where the fifth condition includes at least one of the following:
  the tunnel associated with the N-th port does not exist;
  the TT in which the N-th port is located is an NW-TT;
  and the fourth tunnel does not exist.

Optionally, in a case that the second information is sent by using signaling related to a port-associated tunnel:
  the second information is sent by being included in a port control information container of the signaling related to the port-associated tunnel;
  or
  the second information is included in the signaling related to the port-associated tunnel, and is sent outside a port control information container.

When the communications device 1600 acts as the third communications device in the foregoing method embodiment, the following steps are implemented when the computer program 16011 is executed by the processor 1602:
  obtaining second information; and
  performing a first operation based on the second information, where the first operation includes at least one of the following:
  determining a first port pair;
  determining whether a first port and a second port of the first port pair are ports of a same TT;
  determining whether the first port and the second port of the first port pair satisfy a first condition;
  determining whether the first port and the second port of the first port pair satisfy a second condition; and
  determining information about a bridge delay of the first port pair; where
  the second information includes TT-related information; and
  the first port pair includes the first port and the second port.

Optionally, the determining a first port pair includes:
  determining that the first port pair excludes a port pair of two ports on the same TT.

Optionally, the determining information about a bridge delay of the first port pair based on the second information includes:
  when it is determined that the first condition is satisfied, determining that the information about the bridge delay of the first port pair includes a sum of a first processing time and a second processing time;
  where
  the first processing time is a processing time between the first port and the first terminal; and
  the second processing time is a processing time between the second port and a second terminal; and
  the first port is a port of a first DS-TT; and the second port is a port of a second DS-TT.

Optionally, the first condition includes at least one of the following:
  the first port is a port of the first DS-TT;
  the second port is a port of the second DS-TT;
  the first DS-TT and the second DS-TT are different DS-TTs; and
  the first DS-TT is connected to the first terminal, the second DS-TT is connected to the second terminal, and the first terminal and the second terminal are a same terminal.

Optionally, the determining information about a bridge delay of the first port pair based on the second information includes:
  when it is determined that the second condition is satisfied, determining that the information about the bridge delay of the first port pair includes a sum of a first processing time, a packet delay budget PDB of a first terminal, a second processing time, and a PDB of a second terminal; or
  when it is determined that the second condition is satisfied, determining that the information about the bridge delay of the first port pair includes a sum of a bridge delay of a port pair of the first port and a third port, and a bridge delay of a port pair of the second port and the third port;
  where
  the first port is a port of a first DS-TT; the second port is a port of a second DS-TT; and the third port is a port of an NW-TT;
  the first processing time is a processing time between the first port and the first terminal; and
  the second processing time is a processing time between the second port and the second terminal.

Optionally, the second condition includes at least one of the following:
  the first port is a port of the first DS-TT;
  the second port is a port of the second DS-TT;
  the first DS-TT and the second DS-TT are different DS-TTs; and
  the first DS-TT is connected to the first terminal, the second DS-TT is connected to the second terminal, and the first terminal and the second terminal are different terminals.

Optionally, the performing a first operation based on the second information includes:
  performing the first operation based on second information of a TT in which the first port is located and second information of a TT in which the second port is located.

When the communications device 1600 acts as the fourth communications device in the foregoing method embodiment, the following steps are implemented when the computer program 16011 is executed by the processor 1602:
  obtaining third information; and
  sending the third information; where
  the third information includes information related to a third port;
  the third port is a port of an NW-TT or a DS-TT; and
  the sending the third information includes one of the following:
  selecting a port-associated tunnel and sending the third information by using signaling related to the selected port-associated tunnel; and
  selecting a port-unassociated or preconfigured communications device, and sending the third information to the selected communications device; where
  the port-associated tunnel includes one of the following: a tunnel associated with the third port, and a fifth tunnel; and
  the fifth tunnel includes one of the following: a tunnel associated with any port within a bridge, a tunnel associated with any port on a DS-TT side, and a tunnel associated with any port on an NW-TT side.

Optionally, the selecting a port-associated tunnel and sending the third information by using signaling related to the selected port-associated tunnel includes one of the following:
  if a first condition is satisfied, waiting until the tunnel associated with the third port is established, and sending the third information by using signaling related to the tunnel associated with the third port; or
  if a first condition is satisfied, sending the third information in an establishment process of the tunnel associated with the third port by using signaling related to the tunnel associated with the third port; or if a second condition is satisfied, sending the third information by using setup request signaling of the tunnel associated with the third port; or if a third condition is satisfied, selecting any one of tunnels associated with the third port and sending the third information by using signaling related to the selected tunnel; where the first condition includes at least one of the following: the tunnel associated with the third port does not exist;

the second condition includes at least one of the following: the tunnel associated with the third port does not exist; and a TT in which the third port is located is a DS-TT; and the third condition includes at least one of the following: there are a plurality of tunnels associated with the third port; and the TT in which the third port is located is an NW-TT.

Optionally, the selecting a port-associated tunnel and sending the third information by using signaling related to the port-associated tunnel includes:

if a fourth condition is satisfied, selecting the fifth tunnel, and sending the third information by using signaling related to the fifth tunnel; where the fourth condition includes at least one of the following:

the tunnel associated with the third port does not exist; and a TT in which the third port is located is an NW-TT, or a TT in which the third port is located is a DS-TT.

Optionally, the selecting a port-unassociated or preconfigured communications device, and sending the third information to the selected communications device includes:

if a fifth condition is satisfied, selecting a port-unassociated or preconfigured communications device, and sending the third information to the selected communications device; where the fifth condition includes at least one of the following: the tunnel associated with the third port does not exist; the TT in which the third port is located is an NW-TT; and the fifth tunnel does not exist.

The communications device 1600 is capable of implementing the processes implemented by the communications device in the foregoing method embodiments. To avoid repetition, details are not described herein again.

An embodiment of the present invention further provides a computer-readable storage medium, where a computer program is stored in the computer-readable storage medium. When the computer program is executed by a processor, the processes of any one of the embodiments of the foregoing information transmission method can be implemented, with same technical effects achieved. To avoid repetition, details are not described herein again. The computer-readable storage medium is, for example, a read-only memory (ROM), a random access memory (RAM), a magnetic disk, or an optical disc.

It should be noted that in this specification, the term "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of the present invention essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present invention.

Some embodiments of the present invention have been described with reference to the attached drawings; however, the present invention is not limited to the aforesaid embodiments, and these embodiments are merely illustrative but are not intended to limit the present invention. Persons of ordinary skill in the art may further derive many other implementations according to the teachings of the present invention and within the scope defined in the claims, and all of the implementations shall fall within the scope of the present invention.

What is claimed is:

1. An information transmission method, performed by a third communications device and comprising:

obtaining second information; and performing a first operation based on the second information, wherein the first operation comprises:

determining a bridge delay of a first port pair; wherein the second information comprises at least one of the following:

device-side time-sensitive network translator (DS-TT) related information of a DS-TT to which a first port belongs; or DS-TT related information of a DS-TT to which a second port belongs;

the second information is used for at least one of the following:

identifying a pair of ports is ports on a first DS-TT and a second DS-TT;

identifying the pair of ports is two ports on different time-sensitive network translators (TTs); or identifying the pair of ports is ports on a first DS-TT and a second DS-TT and the second TT are connected to a same terminal or different terminals;

the first port pair comprises the first port and the second port;

wherein the determining the bridge delay of the first port pair based on the second information comprises:

when it is determined that a second condition is satisfied, determining that the bridge delay of the first port pair comprises a sum of a first processing time, a packet delay budget (PDB) of a first terminal, a second processing time, and a PDB of a second terminal; or when it is determined that the second condition is satisfied, determining that the bridge delay of the first port pair comprises a sum of the bridge delay of a port pair of the first port and a third port, and the bridge delay of a port pair of the second port and the third port;

wherein the first port is a port of the first DS-TT; the second port is a port of the second DS-TT; and the third port is a port of a network-side time-sensitive network translator (NW-TT);

the first processing time is a processing time between the first port and the first terminal; and the second processing time is a processing time between the second port and the second terminal.

2. The method according to claim 1, wherein the determining the bridge delay of the first port pair based on the second information further comprises:

when it is determined that a first condition is satisfied, determining that the bridge delay of the first port pair comprises a sum of a first processing time and a second processing time;

wherein the first processing time is a processing time between the first port and the first terminal;

the second processing time is a processing time between the second port and the second terminal; and the first port is a port of the first DS-TT; and the second port is a port of the second DS-TT.

3. The method according to claim 2, wherein the first condition comprises at least one of the following:

the first port is a port of the first DS-TT;

the second port is a port of the second DS-TT;

the first DS-TT and the second DS-TT are different DS-TTs; or the first DS-TT is connected to the first terminal, the second DS-TT is connected to the second terminal, and the first terminal and the second terminal are a same terminal.

4. The method according to claim 1, wherein the second condition comprises at least one of the following:

the first port is a port of the first DS-TT;

the second port is a port of the second DS-TT;

the first DS-TT and the second DS-TT are different DS-TTs; or the first DS-TT is connected to the first terminal, the second DS-TT is connected to the second terminal, and the first terminal and the second terminal are different terminals.

5. The method according to claim 1, wherein the performing the first operation based on the second information comprises:

performing the first operation based on second information of a TT in which the first port is located and second information of a TT in which the second port is located.

6. The method according to claim 1, wherein the first operation further comprises at least one of the following:

determining the first port pair;

determining whether a first port and a second port of the first port pair are ports of a same TT;

determining whether the first port and the second port of the first port pair satisfy a first condition; or determining whether the first port and the second port of the first port pair satisfy a second condition.

7. The method according to claim 6, wherein the determining the first port pair comprises:

determining the first port pair that excludes a port pair of two ports on the same TT.

8. The method according to claim 1, wherein the DS-TT related information comprises at least one of the following:

identification information of the DS-TT; or index information of the DS-TT.

9. The method according to claim 1, the third communications device comprises a core-network (CN) network element, he CN network element comprises at least one of the following:

a session management function (SMF);

a user plane function (UPF);

a policy control function (PCF);

an network exposure function (NEF); or an application function (AF).

10. A communications device, comprising a processor, a memory, and a computer program stored in the memory and capable of running on the processor, wherein when the computer program is executed by the processor, the following steps are implemented:

obtaining second information; and performing a first operation based on the second information, wherein the first operation comprises:

determining a bridge delay of a first port pair; wherein the second information comprises at least one of the following:

device-side time-sensitive network translator (DS-TT) related information of a DS-TT to which a first port belongs; or DS-TT related information of a DS-TT to which a second port belongs;

the second information is used for at least one of the following:

identifying a pair of ports is ports on a first DS-TT and a second DS-TT;

identifying the pair of ports is two ports on different time-sensitive network translators (TTs); or identifying the pair of ports is ports on a first DS-TT and a second DS-TT and the second TT are connected to a same terminal or different terminals;

the first port pair comprises the first port and the second port;

wherein the determining the bridge delay of the first port pair based on the second information comprises:

when it is determined that a second condition is satisfied, determining that the bridge delay of the first port pair comprises a sum of a first processing time, a packet delay budget (PDB) of a first terminal, a second processing time, and a PDB of a second terminal; or when it is determined that the second condition is satisfied, determining that the bridge delay of the first port pair comprises a sum of the bridge delay of a port pair of the first port and a third port, and the bridge delay of a port pair of the second port and the third port;

wherein the first port is a port of the first DS-TT; the second port is a port of the second DS-TT; and the third port is a port of a network-side time-sensitive network translator (NW-TT);

the first processing time is a processing time between the first port and the first terminal; and the second processing time is a processing time between the second port and the second terminal.

11. The communications device according to claim 10, wherein the determining the bridge delay of the first port pair based on the second information further comprises:

when it is determined that a first condition is satisfied, determining that the bridge delay of the first port pair comprises a sum of a first processing time and a second processing time;

wherein the first processing time is a processing time between the first port and the first terminal;

the second processing time is a processing time between the second port and the second terminal; and the first port is a port of the first DS-TT; and the second port is a port of the second DS-TT.

12. The communications device according to claim 11, wherein the first condition comprises at least one of the following:
the first port is a port of the first DS-TT;
the second port is a port of the second DS-TT;
the first DS-TT and the second DS-TT are different DS-TTs; or
the first DS-TT is connected to the first terminal, the second DS-TT is connected to the second terminal, and the first terminal and the second terminal are a same terminal.

13. The communications device according to claim 10, wherein the second condition comprises at least one of the following:
the first port is a port of the first DS-TT;
the second port is a port of the second DS-TT;
the first DS-TT and the second DS-TT are different DS-TTs; or
the first DS-TT is connected to the first terminal, the second DS-TT is connected to the second terminal, and the first terminal and the second terminal are different terminals.

14. The communications device according to claim 10, wherein the performing the first operation based on the second information comprises:
performing the first operation based on second information of a TT in which the first port is located and second information of a TT in which the second port is located.

15. The communications device according to claim 10, wherein the first operation further comprises at least one of the following:
determining the first port pair;
determining whether a first port and a second port of the first port pair are ports of a same TT;
determining whether the first port and the second port of the first port pair satisfy a first condition; or
determining whether the first port and the second port of the first port pair satisfy a second condition.

16. The communications device according to claim 15, wherein the determining the first port pair comprises:
determining the first port pair that excludes a port pair of two ports on the same TT.

17. A non-transitory computer-readable storage medium, wherein the non-transitory computer-readable storage medium stores a program, and when the program is executed by a processor, the following steps are implemented:
obtaining second information; and
performing a first operation based on the second information, wherein the first operation comprises:
determining a bridge delay of a first port pair; wherein the second information comprises at least one of the following:
device-side time-sensitive network translator (DS-TT) related information of a DS-TT to which a first port belongs; or
DS-TT related information of a DS-TT to which a second port belongs;
the second information is used for at least one of the following:
identifying a pair of ports is ports on a first DS-TT and a second DS-TT;

identifying the pair of ports is two ports on different time-sensitive network translators (TT)s; or
identifying the pair of ports is ports on a first DS-TT and a second DS-TT and the second TT are connected to a same terminal or different terminals;
the first port pair comprises the first port and the second port;
wherein the determining the bridge delay of the first port pair based on the second information comprises:
when it is determined that a second condition is satisfied, determining that the bridge delay of the first port pair comprises a sum of a first processing time, a packet delay budget (PDB) of a first terminal, a second processing time, and a PDB of a second terminal; or
when it is determined that the second condition is satisfied, determining that the bridge delay of the first port pair comprises a sum of the bridge delay of a port pair of the first port and a third port, and the bridge delay of a port pair of the second port and the third port;
wherein
the first port is a port of the first DS-TT; the second port is a port of the second DS-TT; and the third port is a port of a network-side time-sensitive network translator (NW-TT);
the first processing time is a processing time between the first port and the first terminal; and
the second processing time is a processing time between the second port and the second terminal.

18. The non-transitory computer-readable storage medium according to claim 17, wherein the determining the bridge delay of the first port pair based on the second information further comprises:
when it is determined that a first condition is satisfied, determining that the bridge delay of the first port pair comprises a sum of a first processing time and a second processing time;
wherein
the first processing time is a processing time between the first port and the first terminal;
the second processing time is a processing time between the second port and the second terminal; and
the first port is a port of the first DS-TT; and the second port is a port of the second DS-TT.

19. The non-transitory computer-readable storage medium according to claim 18, wherein the first condition comprises at least one of the following:
the first port is a port of the first DS-TT;
the second port is a port of the second DS-TT;
the first DS-TT and the second DS-TT are different DS-TTs; or
the first DS-TT is connected to the first terminal, the second DS-TT is connected to the second terminal, and the first terminal and the second terminal are a same terminal.

20. The non-transitory computer-readable storage medium according to claim 17, wherein the second condition comprises at least one of the following:
the first port is a port of the first DS-TT;
the second port is a port of the second DS-TT;
the first DS-TT and the second DS-TT are different DS-TTs; or
the first DS-TT is connected to the first terminal, the second DS-TT is connected to the second terminal, and the first terminal and the second terminal are different terminals.

* * * * *